(12) United States Patent
Miura et al.

(10) Patent No.: US 10,205,836 B2
(45) Date of Patent: Feb. 12, 2019

(54) INFORMATION PROCESSING SYSTEM, INFORMATION PROCESSING APPARATUS, AND CLIENT TERMINAL

(71) Applicants: Ken Miura, Kanagawa (JP); Takehiro Kamata, Tokyo (JP)

(72) Inventors: Ken Miura, Kanagawa (JP); Takehiro Kamata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/875,334

(22) Filed: Jan. 19, 2018

(65) Prior Publication Data

US 2018/0213095 A1 Jul. 26, 2018

(30) Foreign Application Priority Data

Jan. 23, 2017 (JP) .................................. 2017-009332
Feb. 27, 2017 (JP) .................................. 2017-035247

(51) Int. Cl.
*G06F 3/12* (2006.01)
*H04N 1/00* (2006.01)

(52) U.S. Cl.
CPC ......... *H04N 1/00411* (2013.01); *G06F 3/126* (2013.01); *G06F 3/1207* (2013.01);
(Continued)

(58) Field of Classification Search
CPC .... G06F 3/1207; G06F 3/1236; G06F 3/1259; G06F 3/126; G06F 3/1287; G06F 3/1288; H04N 1/00244
(Continued)

(56) References Cited

U.S. PATENT DOCUMENTS

2001/0029531 A1 10/2001 Ohta
2006/0012828 A1 1/2006 Ohta
(Continued)

FOREIGN PATENT DOCUMENTS

| JP | 2001-325182 | 11/2001 |
|---|---|---|
| JP | 2004-220192 | 8/2004 |
| JP | 2016-004363 | 1/2016 |

OTHER PUBLICATIONS

Extended European Search Report dated May 23, 2018 for EP Application No. 18152859.7.

*Primary Examiner* — Neil R McLean
(74) *Attorney, Agent, or Firm* — Harness, Dickey & Pierce, P.L.C.

(57) ABSTRACT

An information processing system includes a client terminal and an information processing apparatus configured to cause an image forming apparatus to perform printing in accordance with print data. The client terminal includes processing circuitry configured to acquire address information of the client terminal on a network; transmit identification information for identifying the client terminal and the address information to the information processing apparatus; and receive a notification transmitted from the information processing apparatus based on the identification information included in the print data. The information processing apparatus includes processing circuitry configured to register the identification information and the address information; extract the identification information from the print data; and transmit the notification in accordance with the address information.

18 Claims, 22 Drawing Sheets

(52) U.S. Cl.
CPC .......... *G06F 3/1236* (2013.01); *G06F 3/1259* (2013.01); *G06F 3/1287* (2013.01); *G06F 3/1288* (2013.01); *H04N 1/00244* (2013.01); *G06F 3/1229* (2013.01)

(58) Field of Classification Search
USPC ........................................................ 358/1.15
See application file for complete search history.

(56) References Cited

U.S. PATENT DOCUMENTS

| | | |
|---|---|---|
| 2015/0205559 A1 | 7/2015 | Miyata |
| 2016/0274842 A1* | 9/2016 | Kuroyanagi ....... H04N 1/00347 |
| 2016/0286061 A1* | 9/2016 | Saka .................. H04N 1/00501 |
| 2017/0078149 A1* | 3/2017 | Utoh .................. H04L 41/0883 |
| 2017/0230532 A1* | 8/2017 | Okuoka ............. H04N 1/32101 |
| 2017/0269888 A1 | 9/2017 | Kamata |

* cited by examiner

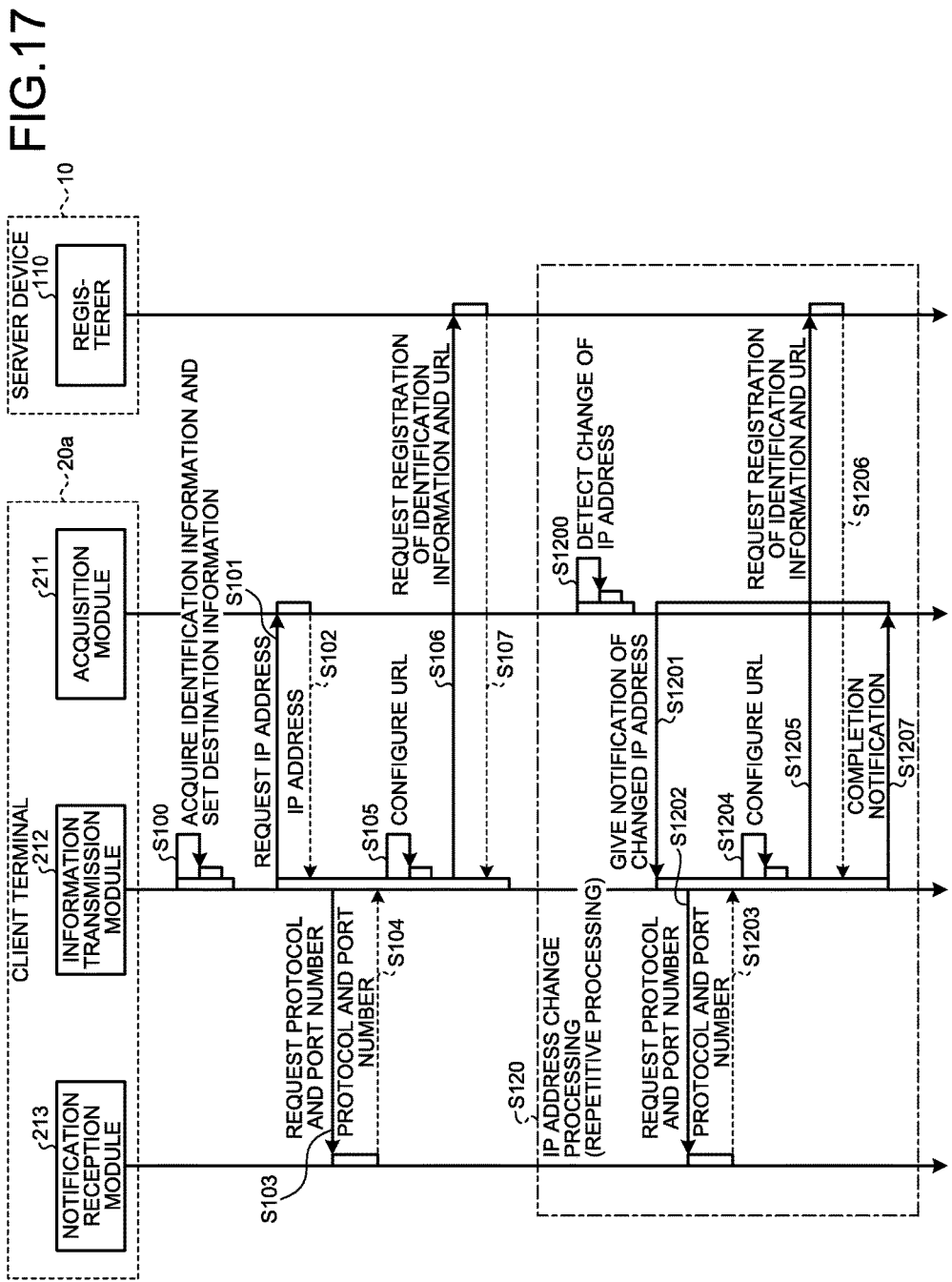

FIG.21

| ID | CLIENT NAME | IP ADDRESS |
|---|---|---|
| 001 | XXX | 192.168.0.100 |
| 002 | YYY | 192.168.0.101 |
| 003 | ZZZ | 192.168.0.102 |
| ⋮ | ⋮ | ⋮ |

FIG.22

| CONDITION | ACTION |
|---|---|
| COLOR PRINTING IS DESIGNATED | PERFORM CONVERSION TO BLACK-AND-WHITE, NOTIFY USER OF OUTPUT IN BLACK-AND-WHITE, AND ACCUMULATION OR OUTPUT PRINT JOB TO DESIGNATED PRINTER |
| PRINTER A IS DESIGNATED AS OUTPUT DESTINATION | ACCUMULATE PRINT JOB |
| PRINTER B IS DESIGNATED AS OUTPUT DESTINATION | OUTPUT PRINT JOB TO PRINTER B |
| ⋮ | ⋮ |

INFORMATION PROCESSING SYSTEM, INFORMATION PROCESSING APPARATUS, AND CLIENT TERMINAL

CROSS-REFERENCE TO RELATED APPLICATIONS

The present application claims priority under 35 U.S.C. § 119 to Japanese Patent Application No. 2017-009332, filed on Jan. 23, 2017; and Japanese Patent Application No. 2017-035247, filed on Feb. 27, 2017. The contents of which are incorporated herein by reference in their entirety.

BACKGROUND OF THE INVENTION

1. Field of the Invention

The present invention relates to an information processing system, an information processing apparatus, and a client terminal.

2. Description of the Related Art

Conventionally, there is a known information processing system, in which a client terminal, a server device, and a shared printer are connected to one another via a network, and the server device causes the shared printer to perform printing of print data output from the client terminal. In the information processing system as mentioned above, there is a known technology for notifying the client terminal of information obtained at the time of printing when the server device causes the shared printer to perform printing.

For example, Japanese Unexamined Patent Application Publication No. 2004-220192 discloses a technology for implementing notification from a server device to a client terminal by causing the client terminal to monitor the server device and acquire a change in the state of the server device.

However, in a system according to the conventional technology in which notification from a server device to a client terminal is implemented by causing the client terminal to monitor the server device, it is difficult for the server device to notify the client terminal of information for which notification is requested, at the time of acquiring the information.

In general, print data transmitted from a client terminal to a server device does not include information indicating an address of the client terminal on the network. Therefore, after communication between the client terminal and the server device for transmitting print data from the client terminal to the server device is completed, the server device is unable to transmit, to the client terminal, information for which notification is requested.

SUMMARY OF THE INVENTION

According to one aspect of the present invention, an information processing system includes a client terminal and an information processing apparatus. The client terminal includes processing circuitry configured to execute a first program for generating print data used for printing by an image forming apparatus. The information processing apparatus includes processing circuitry configured to cause the image forming apparatus to perform printing in accordance with the print data, the information processing apparatus being connected to the client terminal via a network. The processing circuitry of the client terminal is further configured to acquire address information indicating an address of the client terminal on the network by execution of a second program; transmit identification information for identifying the client terminal and the address information to the information processing apparatus by execution of the second program; and receive a notification that is transmitted from the information processing apparatus based on the identification information by execution of the second program, the identification information being included in the print data by execution of the first program and transmitted to the information processing apparatus. The processing circuitry of the information processing apparatus being further configured to register the identification information and the address information transmitted from the information transmission module in an associated manner; extract the identification information from the print data transmitted from the client terminal; and transmit, when information to be transmitted to the client terminal is generated, the information as the notification in accordance with the address information that is registered in association with the extracted identification information.

BRIEF DESCRIPTION OF THE DRAWINGS

FIG. 17 is a sequence diagram illustrating a detailed example of processing of registering identification information and address information on the client terminal in the server device according to the first embodiment;

FIG. 21 is a diagram illustrating an example of information stored in a client terminal information storage unit;

FIG. 22 is a diagram illustrating an example of rule information;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
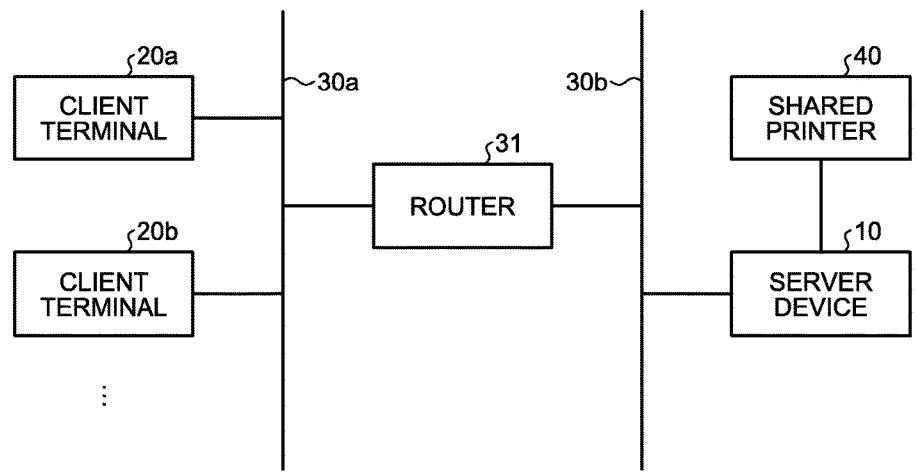
FIG. 1 is a block diagram schematically illustrating a configuration of an information processing system applicable to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to enable a server device to flexibly notify a client terminal of information on printing when the client terminal performs printing via the server device.

First Embodiment

FIG. 1 schematically illustrates a configuration of an information processing system applicable to a first embodiment. In the example in FIG. 1, the information processing system includes: one or more client terminals 20a, 20b, . . . that are connected to a network 30a; a server device 10 that is an information processing apparatus and connected to a network 30b that is connected to the network 30a via a router 31; and a shared printer 40 that is an image forming apparatus and connected to the server device 10. The server device 10 controls printing operation of the shared printer 40. As for the networks 30a and 30b, for example, it is possible to adopt a local area network (LAN) in which transmission control protocol/Internet protocol (TCP/IP) is applicable as a communication protocol.

For example, a user generates document data using a document generation application program in the client terminal 20a, selects the shared printer 40 as a print destination of the document data, and issues an instruction to perform printing.

The client terminal 20a is provided with a printer driver (appropriately referred to as a client-side printer driver) for causing the shared printer 40 to perform printing via the server device 10. The server device 10 is provided with a printer driver (appropriately referred to as a server-side printer driver) for causing the shared printer 40 to perform printing in accordance with an instruction from the printer driver of the client terminal 20a.

The client terminal 20a generates, using the client-side printer driver, print data by converting generated document data to certain data that is printable by the shared printer 40, in accordance with a print instruction. The client terminal 20a transmits the generated print data to the server device 10 via the network 30a, the router 31, and the network 30b, and issues a print instruction to the server device 10. The server device 10 causes, using the server-side printer driver, the shared printer 40 to perform printing based on the print data transmitted from the client terminal 20a in accordance with the print instruction.

The present invention is not limited to this example, but the server device 10 may allow a user to log into the shared printer 40 and to directly perform print instruction operation on the shared printer 40 with respect to a print instruction issued by the client terminal 20a, and cause the shared printer 40 to perform printing based on print data transmitted by the user.

In FIG. 1, an example is illustrated in which the client terminals 20a, 20b, . . . are connected to the network 30a and the server device 10 is connected to the network 30b, where the networks 30a and 30b are connected to each other via the router 31; however, the present invention is not limited to this example. For example, each of the client terminals 20a, 20b, . . . and the server device 10 may be connected to the same network. Further, the networks 30a and 30b may be connected to each other via a different network, such as the Internet.

In FIG. 1, the shared printer 40 is directly connected to the server device 10, but the present invention is not limited to this example. For example, the shared printer 40 may be connected to the server device 10 via the network 30b. Further, the information processing system applicable to the first embodiment may include a plurality of the shared printers 40 such that print operation of each of the shared printers 40 is controlled by the server device 10. In this case, when the client terminal 20a transmits print data and issues a print instruction to the server device 10, a user selects the desired shared printer 40 for performing printing from among the plurality of shared printers 40, for example.

The shared printer 40 is not limited to a printer apparatus that executes only a printing function, but may be a multifunction printer (MFP) that implements a plurality of functions, such as a printing function, a scanner function, a copy function, and a facsimile function, by a single body.

In the first embodiment, the server device 10 in the information processing system as described above registers, in advance, identification information for identifying each of the client terminals 20a, 20b, . . . and address information indicating an address of each of the client terminals 20a, 20b, . . . on the network 30a, in an associated manner. As the identification information, a computer name assigned to each of the client terminals 20a, 20b, . . . may be used. For example, when a driver program in the client terminal 20a issues an instruction on printing to the server device 10, the driver program includes the identification information for identifying the client terminal 20a in print data and transmits the print data to the server device 10.

The server device 10 analyzes the print data, extracts the identification information, and acquires the address information associated with the extracted identification information from among pre-registered combinations of identification information and address information. With this configuration, for example, when information for which notification needs to be given to the client terminal 20a is generated while print data is being printed, the server device 10 can transmit the notification using the acquired address information.

Configuration Applicable to First Embodiment

Figure 2:
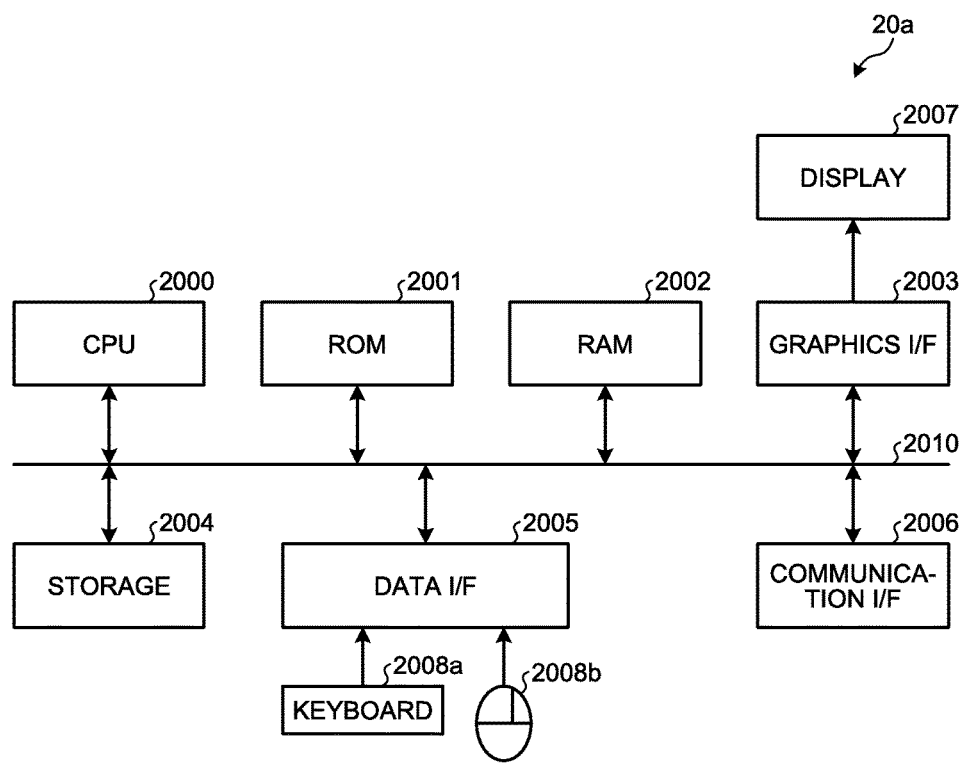
FIG. 2 is a block diagram illustrating a hardware configuration example of a client terminal applicable to the first embodiment.

Next, a configuration applicable to the first embodiment will be described. FIG. 2 illustrates a hardware configuration example of the client terminal 20a that is a personal computer and applicable to the first embodiment. The same configuration is applicable to each of the client terminals 20a, 20b, . . . , and therefore, the client terminal 20a represents all of the client terminals 20a, 20b, . . . in the description below unless otherwise specified.

In FIG. 2, the client terminal 20a includes a central processing unit (CPU) 2000, a read only memory (ROM) 2001, a random access memory (RAM) 2002, a graphics interface (I/F) 2003, a storage 2004, a data I/F 2005, and a communication I/F 2006, all of which are communicably connected to one another via a bus 2010.

The storage 2004 is a storage medium that stores therein data in a non-volatile manner, and a hard disk drive or a flash memory may be adopted. The storage 2004 stores therein programs and data for causing the CPU 2000 to operate.

The CPU 2000 controls the whole operation of the client terminal 20a in accordance with a program that is stored in advance in the ROM 2001 or the storage 2004, by using the RAM 2002 as a working memory, for example. The graphics I/F 2003 generates a display signal that can be handled by a display 2007, based on a display control signal that is generated by the CPU 2000 in accordance with a program. The display 2007 displays a screen corresponding to the display signal supplied from the graphics I/F 2003.

The data I/F 2005 transmits and receives data to and from external apparatuses. As the data I/F 2005, for example, a universal serial bus (USB) may be applied. In this example, as an input device for receiving user input, a keyboard 2008a and a pointing device 2008b are connected to the data I/F 2005. The communication I/F 2006 controls communication over the network 30a in accordance with an instruction from the CPU 2000.

Figure 3:
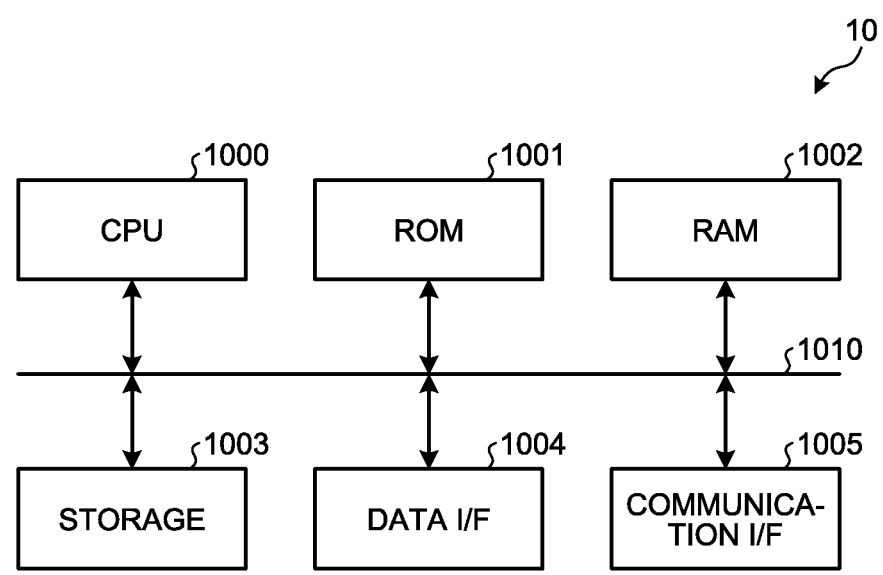
FIG. 3 is a block diagram illustrating a hardware configuration example of a server device applicable to the first embodiment.

FIG. 3 illustrates a hardware configuration example of the server device 10 applicable to the first embodiment. In FIG. 3, the server device 10 includes a CPU 1000, a ROM 1001, a RAM 1002, a storage 1003, a data I/F 1004, and a communication I/F 1005, all of which are communicably connected to one another via a bus 1010.

In FIG. 3, the CPU 1000, the ROM 1001, the RAM 1002, the storage 1003, and the data I/F 1004 are substantially and respectively the same as the CPU 2000, the ROM 2001, the RAM 2002, the storage 2004, the data I/F 2005, and the communication I/F 2006 of the client terminal 20a illustrated in FIG. 2, and therefore, explanation thereof will be omitted. In FIG. 3, the communication I/F 1005 controls communication over the network 30b in accordance with an instruction from the CPU 1000. When the shared printer 40 is directly connected to the server device 10, the shared printer 40 is connected to the data I/F 1004, for example.

The present invention is not limited to this example, but the server device 10 may further include a graphics I/F to which a display is connectable, similarly to the client terminal 20a illustrated in FIG. 2. Further, an input device, such as a keyboard and a mouse, may be connected to the data I/F 1004 in the server device 10, similarly to the client terminal 20a.

Figure 4:
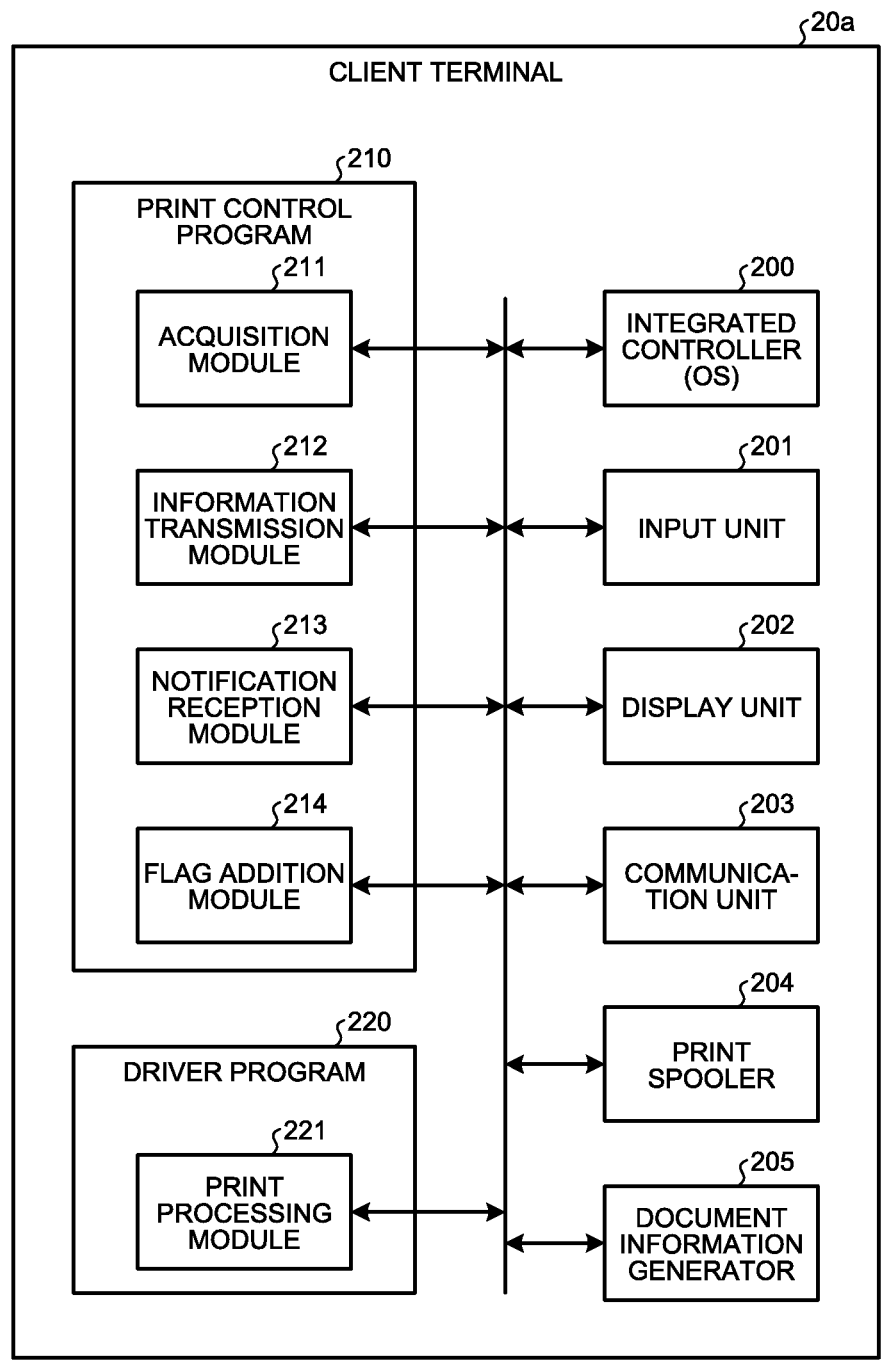
FIG. 4 is an exemplary functional block diagram for explaining functions of the client terminal according to the first embodiment.

FIG. 4 is an exemplary functional block diagram for explaining functions of the client terminal 20a according to the first embodiment. The client terminal 20a according to the first embodiment includes an integrated controller 200, an input unit 201, a display unit 202, a communication unit 203, a print spooler 204, a document information generator 205, an acquisition module 211, an information transmission module 212, a notification reception module 213, a flag addition module 214, and a print processing module 221.

The integrated controller 200, the input unit 201, the display unit 202, the communication unit 203, the print spooler 204, the document information generator 205, the acquisition module 211, the information transmission module 212, the notification reception module 213, the flag addition module 214, and the print processing module 221 are configured with one or more programs that are executed on the CPU 2000.

A program for configuring the above-described units (the integrated controller 200, the input unit 201, the display unit 202, the communication unit 203, the print spooler 204, the document information generator 205, the acquisition module 211, the information transmission module 212, the notification reception module 213, the flag addition module 214, and the print processing module 221) has a module structure including each of the above-described units, for example. As actual hardware, the CPU 2000 reads one or more programs from a storage medium, such as the storage 2004, and executes the one or more programs, so that each of the above-described units is loaded on a main storage device, such as the RAM 2002, and generated on the main storage device.

The present invention is not limited to this example, but a part or the whole of the integrated controller 200, the input unit 201, the display unit 202, the communication unit 203, the print spooler 204, and the document information generator 205 may be configured with hardware circuits that operate in cooperation with one another.

In FIG. 4, the integrated controller 200 is, for example, an operating system (OS), and controls the whole operation of the client terminal 20a. The input unit 201 receives data input from the data I/F 2005. For example, the input unit 201 receives data that is input to the data I/F 2005 through operation on the keyboard 2008a or the pointing device (mouse) 2008b connected to the data I/F 2005. The display unit 202 generates a display control signal for performing displaying on the display 2007. The communication unit 203 controls the communication I/F 2006 and performs communication over the network 30*a*.

The print spooler 204 temporarily stores therein print data (print request) for performing printing, and sequentially transmits the stored print data to a print spooler 102 of the server device 10, which will be described later with reference to FIG. 5. It is assumed that the print spooler 204 stores therein, in advance, destination information indicating an address of the print spooler 102 of the server device 10 to which the print data is transmitted.

The document information generator 205 is an application program for generating a document for example, and includes a word processor program, a spreadsheet program, an image editing program, and the like. Hereinafter, document data, spreadsheet data, image data, and the like that are generated by an application program, such as the word processor program, the spreadsheet program, and the image editing program, will be collectively referred to as document data. The document information generator 205 is installed in the client terminal 20*a* separately from the integrated controller 200, the input unit 201, the display unit 202, the communication unit 203, and the print spooler 204 as described above.

The acquisition module 211, the information transmission module 212, the notification reception module 213, and the flag addition module 214 illustrated in FIG. 4 are configured on the client terminal 20*a* by causing the CPU 2000 to execute a print control program 210 (second program) that is installed in the client terminal 20*a*. Further, the print processing module 221 is configured on the client terminal 20*a* by causing the CPU 2000 to execute a driver program 220 (first program) that is installed in the client terminal 20*a* separately from the print control program 210.

The print control program 210 is provided by being stored in a computer-readable recording medium, such as a compact disk (CD), a flexible disk (FD), or a digital versatile disk (DVD), in a computer-installable or computer-executable file format. The present invention is not limited to this example, but the print control program 210 may be stored in a computer connected to a network, such as the Internet, and provided by downloading via the network. Further, the print control program 210 may be configured to be provided or distributed via a network, such as the Internet. Similarly, the driver program 220 is provided via a computer-readable storage medium or a network.

The print control program 210 is described below. The CPU 2000 executes the print control program 210 on the CPU 2000, and creates functional units for implementing functions for controlling print processing performed by the print processing module 221, which will be described later, on the main storage device, such as the RAM 2002. Among the functions that are generated on the main storage device by the print control program 210, functions according to the first embodiment include the acquisition module 211, the information transmission module 212, the notification reception module 213, and the flag addition module 214 as illustrated in FIG. 4. The present invention is not limited to this example, but the print control program 210 may further create a processing module, which processes print data, on the main storage device by being executed on the CPU 2000.

The acquisition module 211 acquires address information indicating an address of the client terminal 20*a*, in which the acquisition module 211 is provided, on the network 30*a*. The address information acquired by the acquisition module 211 is, for example, an Internet protocol (IP) address indicating the address of the client terminal 20*a* on the network 30*a*. Further, the acquisition module 211 monitors the IP address, and if the IP address is changed, the acquisition module 211 acquires the changed IP address and updates the address information with the acquired IP address.

The information transmission module 212 acquires the IP address from the acquisition module 211. The information transmission module 212 also acquires, from the notification reception module 213 to be described later, a port number and information indicating a communication protocol compatible with the notification reception module 213. The information transmission module 212 configures a uniform resource locator (URL) by combining the information indicating the communication protocol, the IP address, and the port number, which are acquired as above, and then acquires the URL as the address information. In other words, the information transmission module 212 and the acquisition module 211 cooperatively function as one acquisition module that acquires the address information on the client terminal 20*a*.

Further, the information transmission module 212 acquires identification information for identifying the client terminal 20*a* from the integrated controller 200, for example. As the identification information, name information indicating a name (computer name) assigned to the client terminal 20*a* may be used, for example. The computer name is uniquely set, by an administrator of the information processing system or the like, for each of the client terminals 20*a*, 20*b*, . . . over the networks 30*a* and 30*b* that are included in the information processing system, and stored in the integrated controller 200 of each of the client terminals 20*a*, 20*b*, . . . .

The information transmission module 212 transmits a combination of the configured address information (URL) and the identification information acquired from the integrated controller 200 to the server device 10 via the communication unit 203.

In the notification reception module 213, a communication protocol is set in advance, and the port number as described above is assigned in advance as an identifier for communication. In the notification reception module 213, it is assumed that HyperText Transfer Protocol (HTTP) is set as the communication protocol, for example. The notification reception module 213 receives notification information that is transmitted in accordance with the address information including the port number and the information indicating the communication protocol, and performs processing in accordance with the received notification information.

For example, the notification reception module 213 generates display information for displaying a screen that is based on the received notification information. The notification reception module 213 sends the display information to the display unit 202. The display unit 202 generates display control information for displaying a dialogue box on the display 2007 based on the sent display information, for example. The notification reception module 213 also has a function to transmit information that is input in accordance with displaying of the dialogue box to the server device 10 that is a transmission source of the notification information.

The flag addition module 214 monitors the print spooler 204, and if new print data is stored in the print spooler 204, the flag addition module 214 acquires the new print data from the print spooler 204. The flag addition module 214 adds an acquisition complete flag to the print data acquired from the print spooler 204, and returns the print data to the print spooler 204. The acquisition complete flag indicates that the print data is output from the client terminal 20*a* in which the print control program 210 is currently executed, for example.

The driver program 220 is described below. The CPU 2000 executes the driver program 220 on the CPU 2000, and generates the print processing module 221 on the main storage device, such as the RAM 2002.

The print processing module 221 performs processing related to printing when a printer apparatus performs printing. For example, the print processing module 221 converts document data to be printed to certain data that can be interpreted by the printer apparatus, and generates print data including the converted document data. In this case, the print processing module 221 includes, in the print data, print setting information indicating print setting that is input from the input unit 201 in accordance with user operation performed on the input device, for example.

The print setting includes, for example, items such as a document name (document data file name) indicating document data to be printed, a total number of copies to be printed, color information indicating whether color printing or monochrome printing is performed, and printing side information indicating whether one-sided printing or double-sided printing is performed. The print setting is not limited to this example, but may further include other items or may include only part of the above-described items.

The print processing module 221 acquires, from the integrated controller 200, the above-described identification information for identifying the client terminal 20a in which the driver program 220 is installed. The print processing module 221 adds the identification information to the converted print data, and sends the print data, to which the identification information is added, to the print spooler 204. It is possible to install, in the client terminal 20a, a plurality of the driver programs 220 corresponding to a plurality of printer apparatuses of different manufactures or different models, for example.

Figure 5:
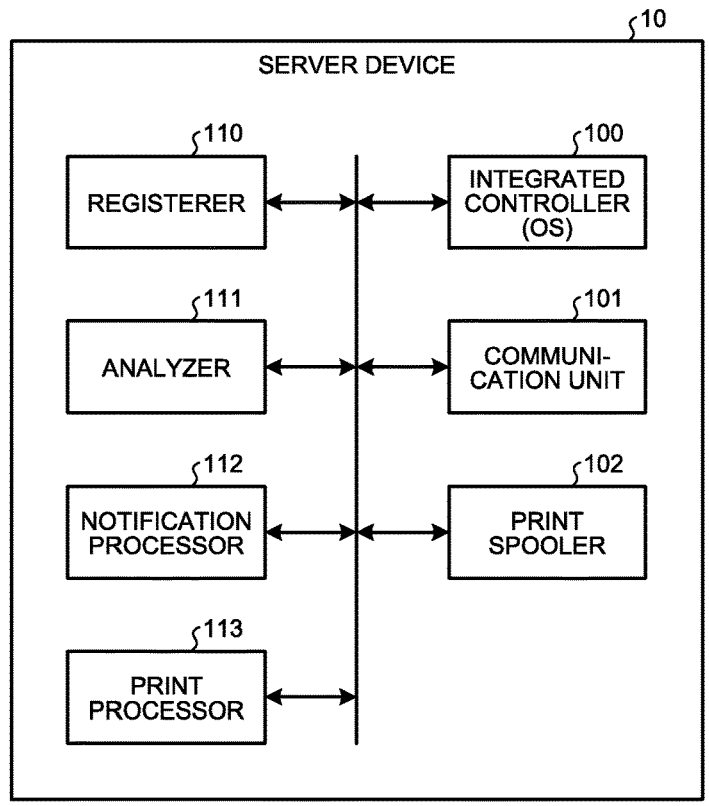
FIG. 5 is an exemplary functional block diagram for explaining functions of the server device according to the first embodiment.

FIG. 5 is an exemplary functional block diagram for explaining functions of the server device 10 according to the first embodiment. In FIG. 5, the server device 10 includes an integrated controller 100, a communication unit 101, the print spooler 102, a registerer 110, an analyzer 111, a notification processor 112, and a print processor 113.

The integrated controller 100, the communication unit 101, the print spooler 102, the registerer 110, the analyzer 111, the notification processor 112, and the print processor 113 are configured by a program that is executed on the CPU 1000. The present invention is not limited to this example, but a part or the whole of the integrated controller 100, the communication unit 101, the print spooler 102, the registerer 110, the analyzer 111, the notification processor 112, and the print processor 113 may be configured with hardware circuits that operate in cooperation with one another.

The integrated controller 100 is, for example, an OS, and controls the whole operation of the server device 10. The communication unit 101 controls the communication I/F 1005 and performs communication over the network 30b. The print spooler 102 stores therein print data that is transmitted from the print spooler 204 of the client terminal 20a, and sequentially outputs the stored print data to the shared printer 40.

The print processor 113 performs predetermined processing on the print data stored in the print spooler 102. The print processor 113 extracts the print setting information from the print data. The print processor 113 processes the print data based on a print condition that is set by an administrator of the information processing system, or the like, for example. The print processor 113 associates processing information that is information indicating contents of processing with the print data to be output, and returns the print data to the print spooler 102. The processing information is, for example, information indicating an item for which a value has been processed among the items included in the print setting information.

For example, when the printing is restricted to monochrome printing among color printing and monochrome printing by the print condition, the print processor 113 is forced to rewrite color information included in the print setting information with a value indicating the monochrome printing. For another example, when printing is restricted to one-sided printing among the one-sided printing and double-sided printing by the print condition, the print processor 113 is forced to rewrite the printing side information included in the print setting information with a value indicating the one-sided printing. The print processor 113 processes the print data by rewriting the print setting information as described above. The present invention is not limited to this example, but the print processor 113 may process the document data itself, which is included in the print data.

The registerer 110 receives a combination of the address information and the identification information transmitted from the information transmission module 212 of each of the client terminals 20a, 20b, . . . , and stores the address information and the identification information received as above in the storage 1003 in an associated manner, for example. With this operation, the registerer 110 registers the combination of the address information and the identification information for each of the client terminals 20a, 20b, . . . .

Table 1 illustrates an example of a registration table, in which the registerer 110 registers the combination of the address information and the identification information for each of the client terminals 20a, 20b, . . . . Here, a computer name is used as the identification information, and each of records in the registration table includes a single computer name and address information (URL) associated with the computer name. In this example, HTTP ("http://") is designated as a protocol and a port number of "58008" is set in each piece of the address information. The registration table is stored in, for example, the storage 1003 of the server device 10.

TABLE 1

| Computer Name | Address Information (URL) |
| --- | --- |
| A050793600 | http://10.60.95.55:58008 |
| B050983500 | http://10.60.95.56:58008 |
| . | . |
| . | . |
| . | . |

For example, it is assumed that the computer name of the client terminal 20a is set to "A050793600". In this case, if the server device 10 transmits a notification over the network 30a in accordance with the address information "http://10.60.95.55:58008" that is associated with the computer name "A050793600", the transmitted notification is received by the client terminal 20a and sent to the notification reception module 213 in accordance with the port number.

The analyzer 111 retrieves, from the print spooler 102, print data to which the acquisition complete flag is added. The analyzer 111 analyzes the retrieved print data, and acquires notification information, which is provided as notification to the client terminal 20a serving as a transmission source of the print data, from the print data based on an analysis result. Further, the analyzer 111 extracts the identification information from the print data based on the analysis result. That is, the analyzer 111 functions as an extractor that extracts identification information from print data.

Among pieces of print data stored in the print spooler 102, a piece of print data to which the acquisition complete flag is not added can be regarded as print data that is transmitted from a client terminal in which the print control program 210 is not installed. Therefore, the analyzer 111 ignores a piece of print data to which the acquisition complete flag is not added among the pieces of print data stored in the print spooler 102.

The analyzer 111 sends the notification information and the identification information acquired and extracted from the print data to the notification processor 112. Table 2 illustrates an example of a data structure of data that is sent from the analyzer 111 to the notification processor 112 and that includes the notification information and the identification information. As indicated in Table 2, the analyzer 111 sends each piece of information to the notification processor 112 using a data structure, in which the identification information (computer name) is associated with each of the items of the print setting information (the document name, the total number of copies to be printed, the color information, and the printing side).

TABLE 2

| | |
|---|---|
| Computer Name | A050793600 |
| Document Name | Test.doc |
| Total Number of Copies | 8 |
| Color Information | Color |
| Printing Side | One-sided |

The notification information that is sent from the analyzer 111 to the notification processor 112 is not limited to the print setting information. That is, the analyzer 111 may send other information as the notification information to the notification processor 112 as long as the information can be acquired when printing is performed according to the print data. For example, the server device 10 may be provided with a function to monitor the state of the shared printer 40 (an amount of remaining toner, sheet replenishment, paper jam, and the like), and the state of the shared printer 40 acquired by this function may be used as the notification information.

Further, the analyzer 111 may add the above-described processing information to the print setting information and use this information as the notification information. For example, the analyzer 111 can add the processing information to the print setting information by adding a flag indicating processing completion to a certain item for which a value has been processed and which is included in the processing information among the items of the print setting information.

The notification processor 112 gives a notification to the client terminals 20a, 20b, . . . using the notification information and the identification information sent from the analyzer 111. The notification processor 112 refers to the registration table, which is stored in the storage 1003 by the registerer 110, based on the identification information sent from the analyzer 111, and acquires the address information associated with the identification information. The notification processor 112 transmits the notification information, which is sent from the analyzer 111, by using the address indicated by the acquired address information as a destination.

With reference to FIG. 6 to FIG. 9, the print spooler 204, the acquisition module 211, the information transmission module 212, the notification reception module 213, and the flag addition module 214 of the client terminal 20a will be described in detail.

Figure 6:
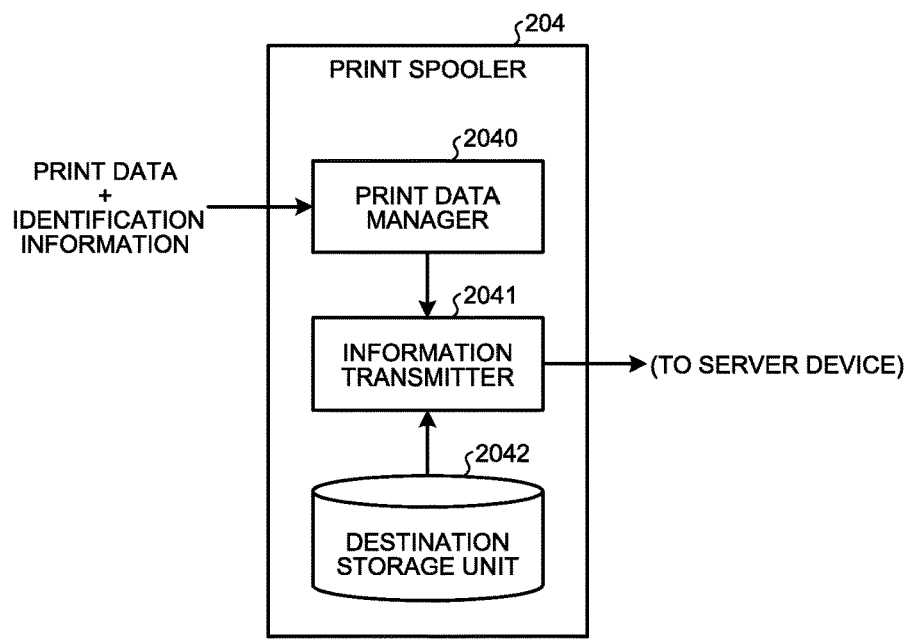
FIG. 6 is an exemplary functional block diagram for explaining functions of a print spooler that is provided on the client terminal side and applicable to the first embodiment.

FIG. 6 is an exemplary functional block diagram for explaining functions of the print spooler 204 applicable to the first embodiment. In FIG. 6, the print spooler 204 includes a print data manager 2040, an information transmitter 2041, and a destination storage unit 2042. The destination storage unit 2042 stores therein destination information for specifying the print spooler 102 included in the server device 10 as a destination.

The print data manager 2040 stores, in a storage medium, the print data that includes the identification information and that is sent from the print processing module 221. As the storage medium, for example, a management area of the print spooler 204 in the storage 2004 may be used. Further, the print data manager 2040 reads the print data stored in the storage medium, and sends the print data to the information transmitter 2041. The information transmitter 2041 transmits the print data sent from the print data manager 2040 to the server device 10 in accordance with the destination information stored in the destination storage unit 2042.

Figure 7:
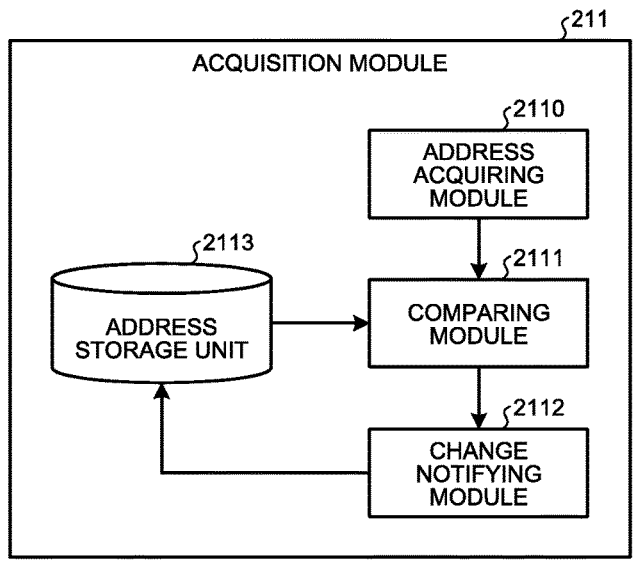
FIG. 7 is an exemplary functional block diagram for explaining functions of an acquisition module according to the first embodiment.

FIG. 7 is an exemplary functional block diagram for explaining functions of the acquisition module 211 according to the first embodiment. In FIG. 7, the acquisition module 211 includes an address acquiring module 2110, a comparing module 2111, a change notifying module 2112, and an address storage unit 2113.

The address acquiring module 2110 acquires the IP address of the client terminal 20a from the integrated controller 200. The comparing module 2111 compares the IP address acquired by the address acquiring module 2110 and the IP address stored in the address storage unit 2113. The change notifying module 2112 detects a change in the IP address based on a comparison result obtained by the comparing module 2111. Upon detecting a change in the IP address, the change notifying module 2112 stores the IP address acquired by the address acquiring module 2110 in the address storage unit 2113 in an overwriting manner to thereby update the IP address stored in the address storage unit 2113.

Figure 8:
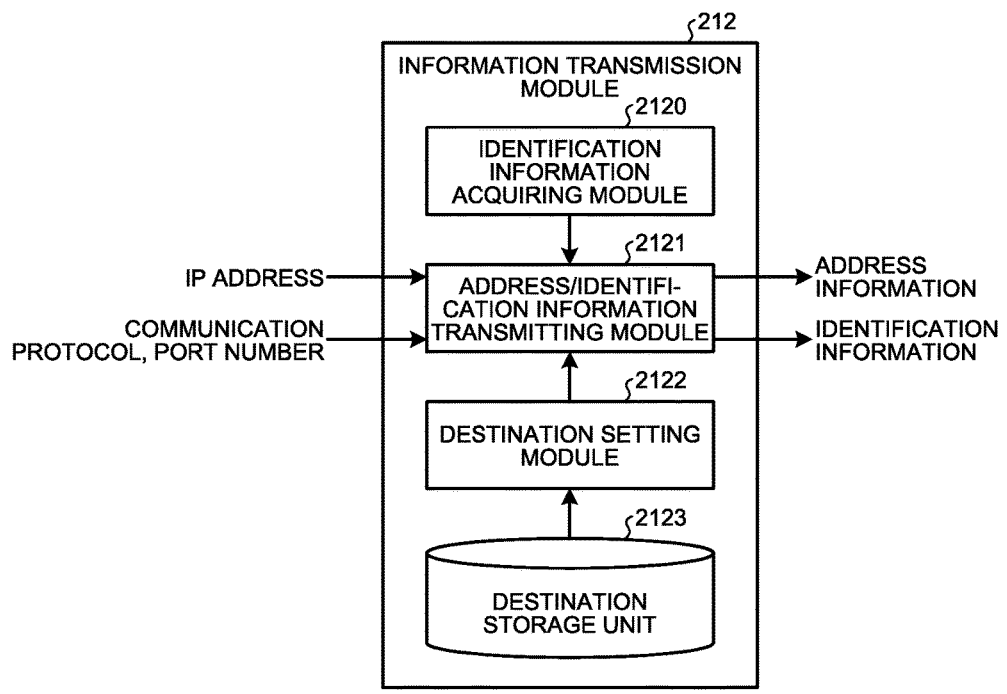
FIG. 8 is an exemplary functional block diagram for explaining functions of an information transmission module according to the first embodiment.

FIG. 8 is an exemplary functional block diagram for explaining functions of the information transmission module 212 according to the first embodiment. In FIG. 8, the information transmission module 212 includes an identification information acquiring module 2120, an address/identification information transmitting module 2121, a destination setting module 2122, and a destination storage unit 2123. The destination storage unit 2123 stores therein destination information for specifying the registerer 110 of the server device 10 as a destination.

The identification information acquiring module 2120 acquires, from the integrated controller 200, the identification information (computer name) on the client terminal 20a that includes the identification information acquiring module 2120. The destination setting module 2122 sets, in the address/identification information transmitting module 2121, the destination information stored in the destination storage unit 2123.

The address/identification information transmitting module 2121 acquires, from the acquisition module 211, the IP address stored in the address storage unit 2113. Further, the address/identification information transmitting module 2121 acquires, from the notification reception module 213, the port number and the information indicating a communication protocol compatible with the notification reception module 213. The address/identification information transmitting module 2121 configures a URL, as the address information, by combining the IP address, the information indicating the communication protocol, and the port number.

The address/identification information transmitting module 2121 transmits the configured URL (address information) and the identification information acquired by the identification information acquiring module 2120 to the destination in accordance with the destination information set by the destination setting module 2122.

Figure 9:
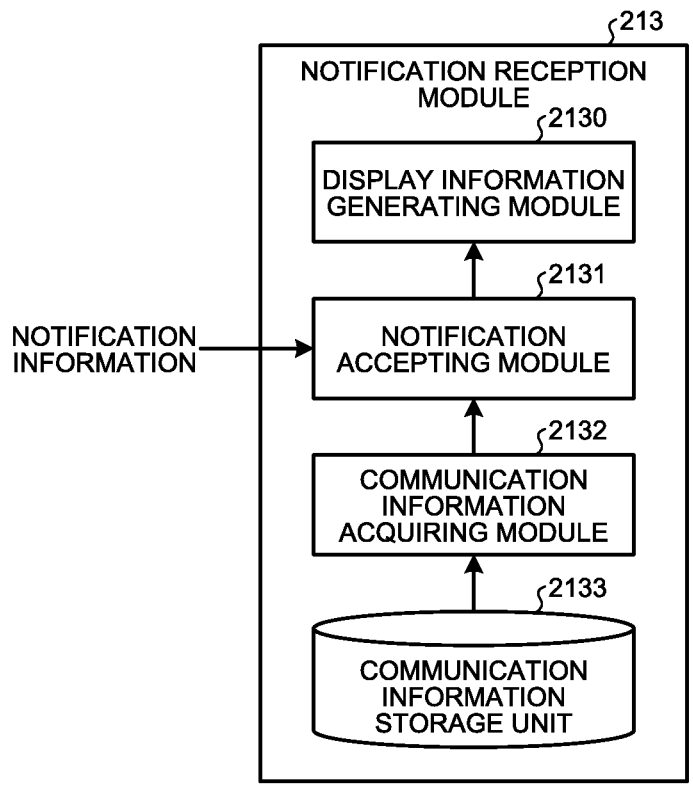
FIG. 9 is an exemplary functional block diagram for explaining functions of a notification reception module according to the first embodiment.

FIG. 9 is an exemplary functional block diagram for explaining functions of the notification reception module 213 according to the first embodiment. In FIG. 9, the notification reception module 213 includes a display information generating module 2130, a notification accepting module 2131, a communication information acquiring module 2132, and a communication information storage unit 2133.

The notification accepting module 2131 has a port number set in advance, and receives the notification information, for which the communication protocol, the IP address, and the port number are designated and which is transmitted from the server device 10 and received by the client terminal 20a. The display information generating module 2130 generates display information for displaying a dialogue box on the display 2007 based on the notification information received by the notification accepting module 2131.

The communication information storage unit 2133 stores therein the port number and the information indicating the communication protocol, which are set in the notification accepting module 2131. The communication information acquiring module 2132 returns the information indicating the communication protocol that is stored in the communication information storage unit 2133 and the port number that is set in the notification reception module 213, depending on a request. For example, when the change notifying module 2112 of the acquisition module 211 determines that the IP address of the client terminal 20a is changed, the address/identification information transmitting module 2121 transmits, to the server device 10, address information which includes the changed IP address and which is sent from the acquisition module 211. In this case, the acquisition module 211 generates the address information by referring to the information indicating the communication protocol and the port number, which are stored in the communication information storage unit 2133.

Figure 10:
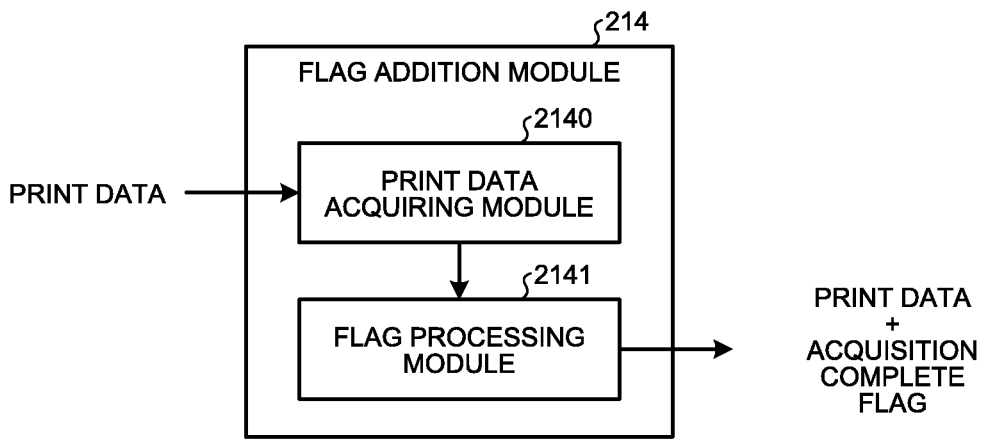
FIG. 10 is an exemplary functional block diagram for explaining functions of a flag addition module according to the first embodiment.

FIG. 10 is an exemplary functional block diagram for explaining functions of the flag addition module 214 according to the first embodiment. In FIG. 10, the flag addition module 214 includes a print data acquiring module 2140 and a flag processing module 2141. The print data acquiring module 2140 monitors the print spooler 204, and if new print data (print data to which the acquisition complete flag is not added) is stored in the print spooler 204, the print data acquiring module 2140 acquires the new print data from the print spooler 204. The flag processing module 2141 adds the acquisition complete flag to the print data acquired by the print data acquiring module 2140. The flag processing module 2141 returns the print data, to which the acquisition complete flag is added, to the print spooler 204.

With reference to FIG. 11 to FIG. 14, the print spooler 102, the analyzer 111, the registerer 110, and the notification processor 112 of the server device 10 will be described in detail.

Figure 11:
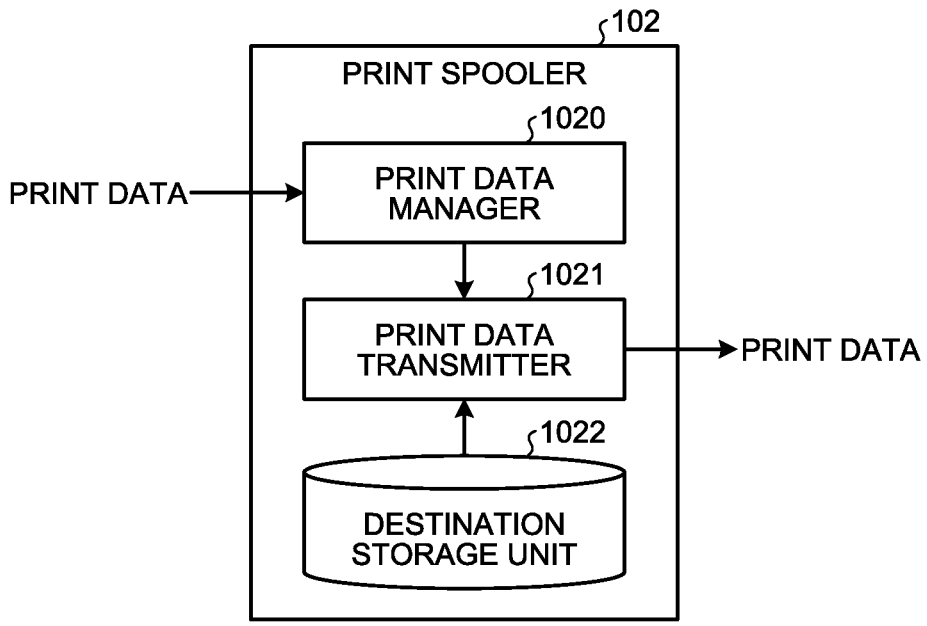
FIG. 11 is an exemplary functional block diagram for explaining functions of a print spooler that is provided on the server device and applicable to the first embodiment.

FIG. 11 is an exemplary functional block diagram for explaining functions of the print spooler 102 applicable to the first embodiment. In FIG. 11, the print spooler 102 includes a print data manager 1020, a print data transmitter 1021, and a destination storage unit 1022. The destination storage unit 1022 stores therein destination information indicating an address of the shared printer 40 that serves as a transmission destination to which the print data is transmitted from the server device 10.

The print data manager 1020 receives print data that includes the identification information and that is transmitted from the print spooler 204 of the client terminal 20a, and stores the received print data in a storage medium. As the storage medium, for example, a management area of the print spooler 102 in the storage 1003 may be used.

Further, the print data manager 1020 reads the print data stored in the storage medium, and sends the print data to the print data transmitter 1021. In this case, the print data manager 1020 sends this print data to the analyzer 111, and requests the analyzer 111 to analyze the sent print data. The print data transmitter 1021 transmits the print data sent from the print data manager 1020 to the shared printer 40 in accordance with the destination information stored in the destination storage unit 1022.

Figure 12:
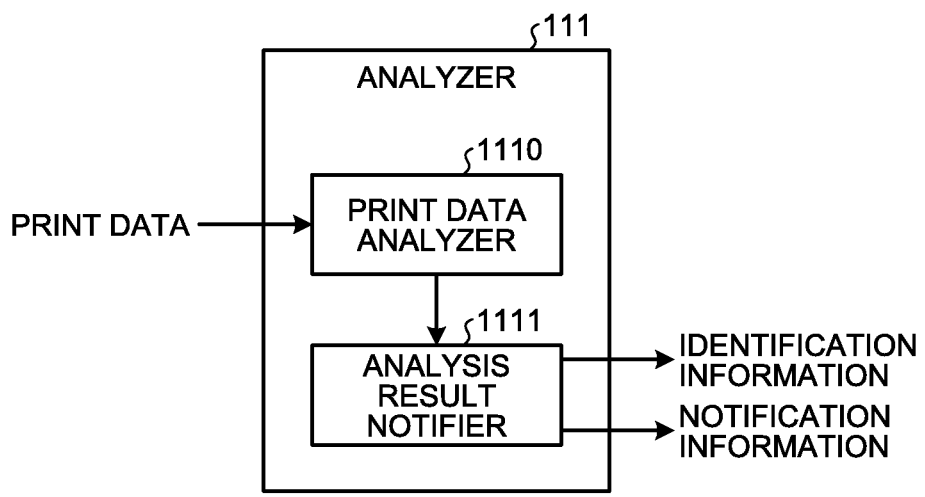
FIG. 12 is an exemplary functional block diagram for explaining functions of an analyzer according to the first embodiment.

FIG. 12 is an exemplary functional block diagram for explaining functions of the analyzer 111 according to the first embodiment. In FIG. 12, the analyzer 111 includes a print data analyzer 1110 and an analysis result notifier 1111.

The print data analyzer 1110 receives the print data sent from the print spooler 102. The print data analyzer 1110 analyzes the received print data in accordance with the request from the print spooler 102, and extracts the identification information from the print data based on an analysis result. Further, the print data analyzer 1110 acquires the notification information, which is provided as notification to the client terminal 20a serving as a transmission source of the print data, based on the analysis result of the print data. The analysis result notifier 1111 sends the identification information and the notification information extracted and acquired by the print data analyzer 1110 to the registerer 110 and the notification processor 112, respectively.

Figure 13:
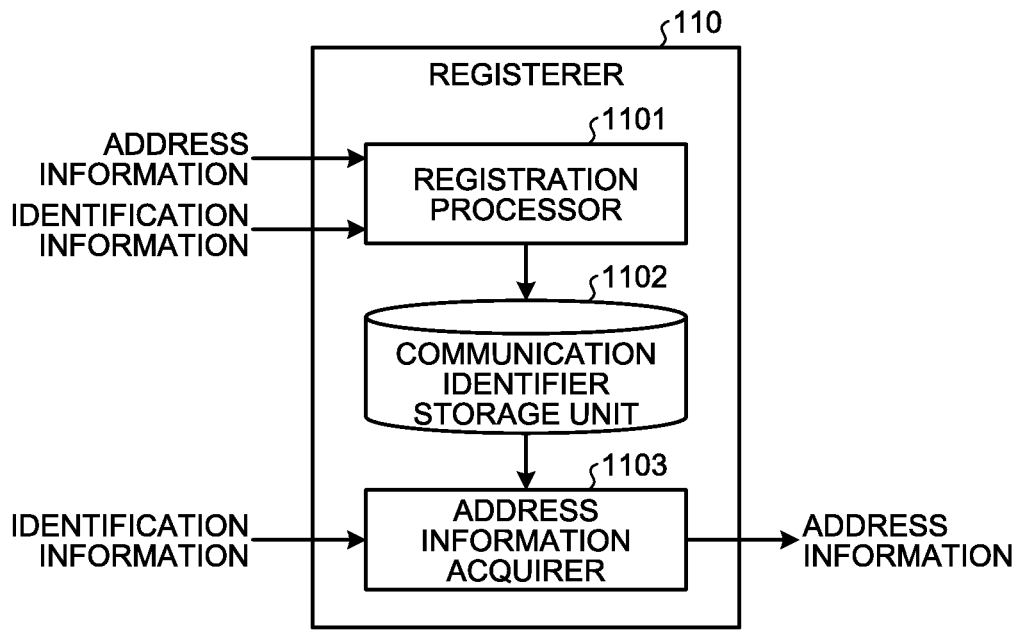
FIG. 13 is an exemplary functional block diagram for explaining functions of a registerer according to the first embodiment.

FIG. 13 is an exemplary functional block diagram for explaining functions of the registerer 110 according to the first embodiment. In FIG. 13, the registerer 110 includes a registration processor 1101, a communication identifier storage unit 1102, and an address information acquirer 1103.

The registration processor 1101 receives the address information (URL in this example) and the identification information, which are transmitted from the information transmission module 212 of the client terminal 20a and received by the server device 10, and sends the address information and the identification information to the communication identifier storage unit 1102. The communication identifier storage unit 1102 registers the address information and the identification information, which are sent from the registration processor 1101, in the registration table in an associated manner as indicated by Table 1. The address information acquirer 1103 refers to the registration table based on the identification information sent from the analyzer 111, and acquires the address information associated with the identification information. The address information acquirer 1103 sends the acquired address information to the notification processor 112.

Figure 14:
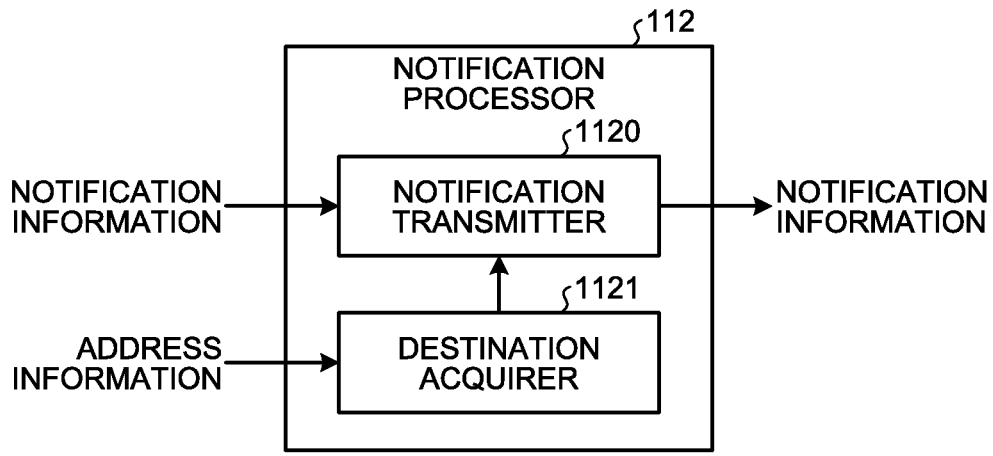
FIG. 14 is an exemplary functional block diagram for explaining functions of a notification processor according to the first embodiment.

FIG. 14 is an exemplary functional block diagram for explaining functions of the notification processor 112 according to the first embodiment. In FIG. 14, the notification processor 112 includes a notification transmitter 1120 and a destination acquirer 1121. The destination acquirer 1121 acquires the address information sent from the registerer 110. The notification transmitter 1120 transmits the notification information sent from the analyzer 111 to an address indicated by the address information acquired by the destination acquirer 1121.

Details of Notification Processing According to First Embodiment

Figure 15:
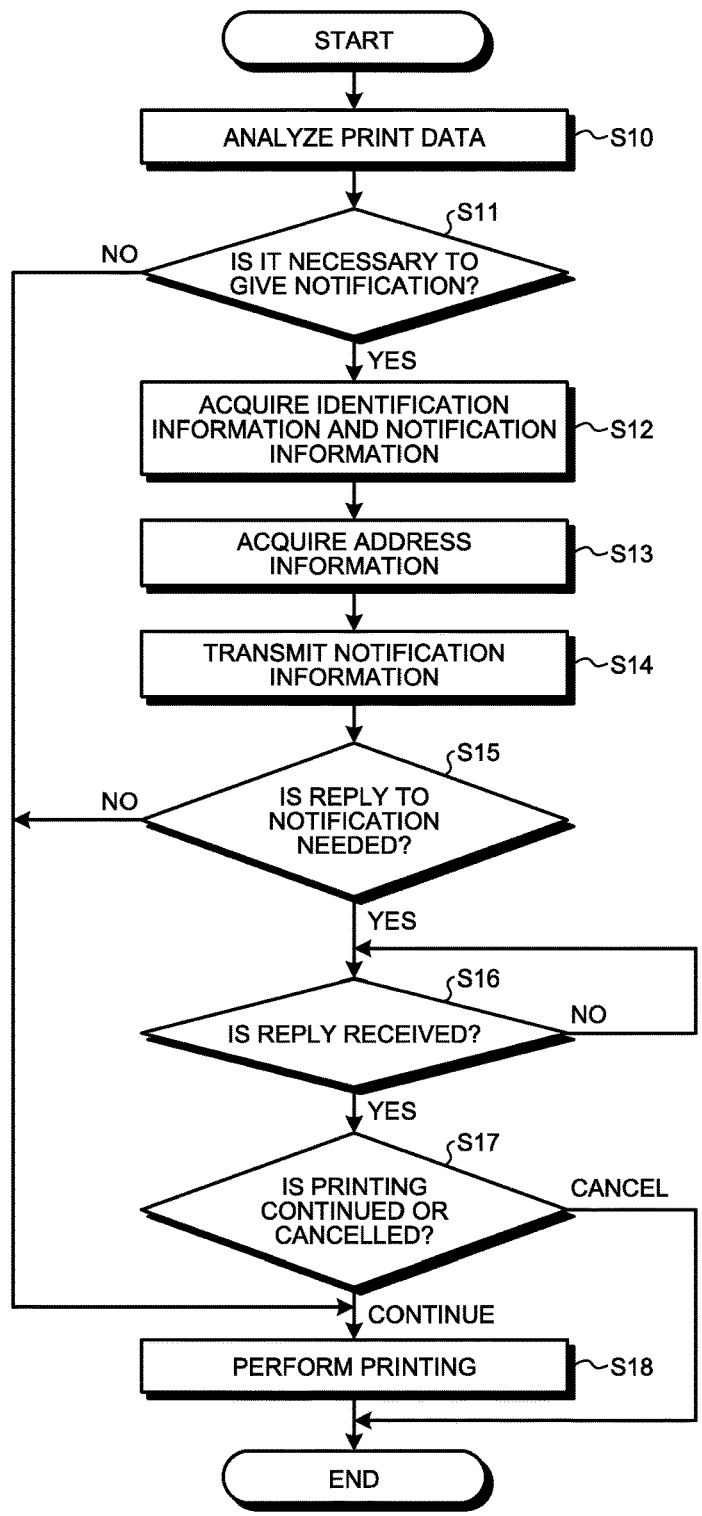
FIG. 15 is a flowchart illustrating an example of notification processing in the server device according to the first embodiment.

Next, notification processing according to the first embodiment will be described in detail. FIG. 15 is a flowchart illustrating an example of the notification processing in the server device 10 according to the first embodiment. It is assumed that, in the server device 10, the registerer 110 registers the identification information and the address information in the registration table in an associated manner for each of the client terminals 20a, 20b, . . . in advance of the processing in FIG. 15.

The processing in FIG. 15 starts when the server device 10 acquires, by the print spooler 102, print data transmitted from the client terminal 20a, calls the analyzer 111, and requests the analyzer 111 to analyze the acquired print data, for example.

In FIG. 15, at Step S10, the analyzer 111 in the server device 10 analyzes print data that is an analysis target acquired by the print spooler 102, in accordance with the request from the print spooler 102. At subsequent Step S11, the server device 10 determines whether it is necessary to give a notification to the client terminal 20a that is a transmission source of the analysis target print data, based on a result of analysis at Step S10. If the server device 10 determines that it is necessary to give a notification (Yes at Step S11), the process proceeds to Step S12. In contrast, if the server device 10 determines that it is not necessary to give a notification (No at Step S11), the process proceeds to Step S18.

For example, at Step S11, the server device 10 determines, by the analyzer 111, whether the acquisition complete flag is added to the print data acquired at Step S10, and determines that it is necessary to give a notification when determining that the acquisition complete flag is added. The present invention is not limited to this example, but the server device 10 may refer to the registration table based on the identification information that is acquired by the analyzer 111 through analysis of the print data, and determine that it is necessary to give a notification when the acquired identification information is registered in the registration table. In this case, it is not necessary for the client terminal 20a to add the acquisition complete flag, so that it is possible to omit the flag addition module 214. Furthermore, the server device 10 may determine that it is not necessary to give a notification when the identification information is not acquired by the analyzer 111 through analysis of the print data.

At Step S12, the server device 10 acquires the identification information and the notification information from the analysis target print data based on the analysis result that is obtained by the analyzer 111 at Step S10. At subsequent Step S13, the server device 10 refers to, by the registerer 110 for example, the registration table based on the identification information acquired at Step S11, and acquires the address information associated with the identification information. At subsequent Step S14, the server device 10 transmits, by the notification processor 112, the notification information that is acquired by the analyzer 111 at Step S12, to an address indicated by the address information acquired at Step S13.

At subsequent Step S15, the server device 10 determines, by the notification processor 112, whether a notification indicated by the notification information transmitted at Step S14 is a notification for which a reply from the client terminal 20a serving as the transmission source is needed, for example. If the server device 10 determines that the notification is a notification for which a reply from the transmission source is needed (Yes at Step S15), the process proceeds to Step S16. In contrast, if the server device 10 determines that the notification is a notification for which a reply is not needed (No at Step S15), the process proceeds to Step S18.

For example, at Step S15, if the print setting information acquired by the analyzer 111 through analysis of the pint data is print setting information that has been changed by the server device 10, the notification processor 112 can determine, by the notification transmitter 1120, that the notification is a notification for which a reply from the transmission source is needed. More specifically, when a processing complete flag is added to a predetermined item in the print setting information, the notification transmitter 1120 determines that the notification is a notification for which a reply from the transmission source is needed.

Figure 16A:
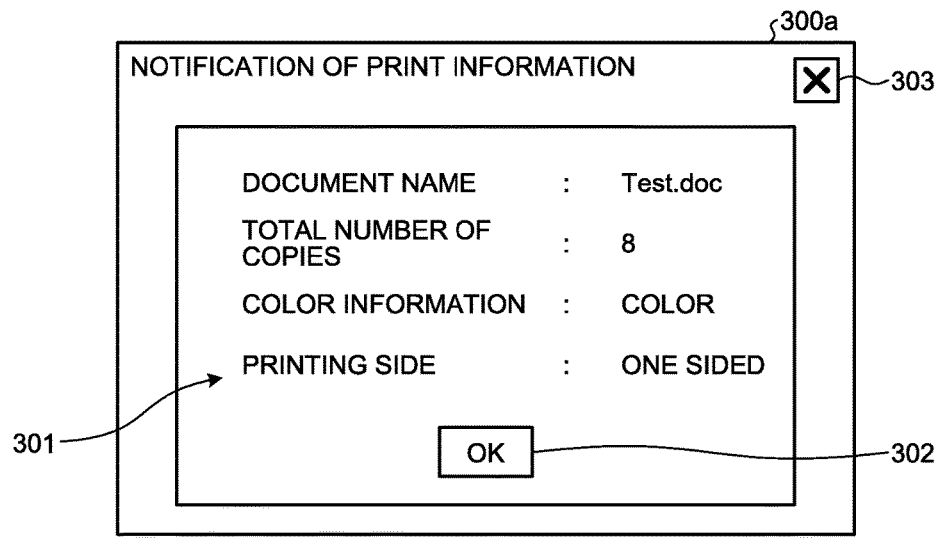
FIGS. 16A and 16B illustrate examples of a dialogue box that is displayed on the client terminal and applicable to the first embodiment.
Figure 16B:
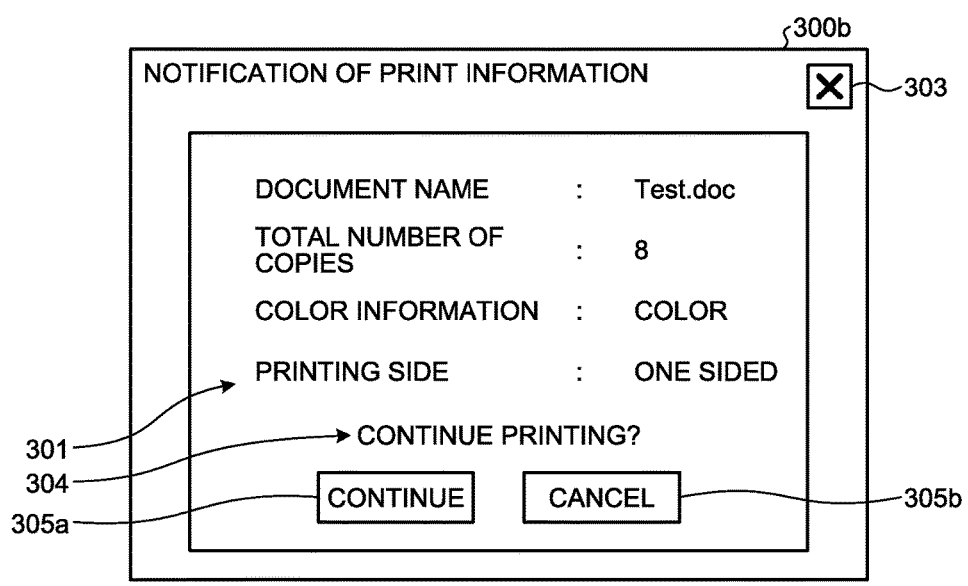

With reference to FIGS. 16A and 16B, an example of a dialogue box applicable to the first embodiment will be described. Each of dialogue boxes 300a and 300b illustrated in FIGS. 16A and 16B is displayed on a display of a transmission source (for example, the client terminal 20a) based on the notification information transmitted by the notification transmitter 1120.

FIG. 16A illustrates an example of the dialogue box 300a in a case where a reply from a transmission source is not needed. If it is determined that a reply to the notification is not needed at Step S15 (No at Step S15), the notification reception module 213 of the client terminal 20a serving as the transmission source generates display information for displaying the dialogue box 300a based on the notification information transmitted by the notification transmitter 1120. In FIG. 16A, the dialogue box 300a includes a notification information display area 301, an "OK" button 302, and a button 303 for closing the dialogue box 300a (referred to as the "close" button 303)

In the notification information display area 301, contents of a notification that is based on the notification information are displayed. In the example in FIG. 16A, an item name and a value of each of items included in the print setting information, based on the notification information is displayed in the notification information display area 301. The "OK" button 302 is a button for closing the dialogue box 300a, similarly to the "close" button 303. When the dialogue box 300a is closed by user operation on any of the "OK" button 302 and the "close" button 303, the client terminal 20a does not perform any operation on the server device 10.

FIG. 16B illustrates an example of the dialogue box 300b in a case where a reply from a transmission source is needed. In FIG. 16B, the same components as those illustrated in FIG. 16A described above are denoted by the same reference signs, and detailed explanation thereof will be omitted. If it is determined that a reply to the notification is needed at Step S15 (Yes at Step S15), the notification reception module 213 in the client terminal 20a serving as the transmission source generates display information for displaying the dialogue box 300b based on the notification information transmitted by the notification transmitter 1120.

In FIG. 16B, in the dialogue box 300b, a message area 304 is added and a "continue" button 305a and a "cancel" button 305b are provided instead of the "OK" button 302, as compared to the dialogue box 300a illustrated in FIG. 16A. In the message area 304, displayed is a message for requesting operation of designating whether to perform printing in accordance with print information displayed on the notification information display area 301. The "continue" button 305*a* is a button for designating execution of printing that is based on the print information displayed on the notification information display area 301. In contrast, the "cancel" button 305*b* is a button for designating cancellation of printing that is based on the print information displayed on the notification information display area 301.

When the input unit 201 accepts input operation on any of the "continue" button 305*a* and the "cancel" button 305*b*, the client terminal 20*a* sends, to the notification reception module 213, information indicating the button on which the operation is accepted, for example. The notification reception module 213 transmits, to the server device 10, the information indicating the button on which the operation is accepted, as a reply to the notification provided by the dialogue box 300*b*. In FIG. 16B, the "close" button 303 may have the same function as the "cancel" button 305*b*, for example.

At Step S16, the server device 10 determines whether the communication unit 101 has received a reply to the notification information that is transmitted to the client terminal 20*a* at Step S14. If the server device 10 determines that the reply has not been received (No at Step S16), the processing returns to Step S16. In contrast, if the server device 10 determines that the reply has been received (Yes at Step S16), the processing proceeds to Step S17.

At Step S17, the server device 10 determines whether the reply received at Step S16 indicates either continuation or cancellation. For example, if the server device 10 determines that the communication unit 101 has received a reply indicating continuation of the printing ("continue" at Step S17), the processing proceeds to Step S18, and the server device 10 requests the print spooler 204 to cause the shared printer 40 to perform printing in accordance with the print data that is taken as the analysis target at Step S10.

In contrast, if the server device 10 determines that the communication unit 101 has received the reply indicating cancellation of the printing ("cancel" at Step S17), the server device 10 does not perform printing using the print data, but ends the series of processing in the flowchart in FIG. 15.

FIG. 17 is a sequence diagram illustrating a concrete example of processing of registering the identification information and the address information on the client terminal 20*a* in the server device 10 according to the first embodiment. In FIG. 17, the same components as those illustrated in FIG. 4 and FIG. 5 as described above are denoted by the same reference signs, and detailed explanation thereof will be omitted. The processing in FIG. 17 starts after the client terminal 20*a* is activated, the print control program 210 is executed, and the acquisition module 211, the information transmission module 212, the notification reception module 213, and the flag addition module 214 are formed on the main storage device, for example.

At Step S100, the information transmission module 212 in the client terminal 20*a* acquires, by the identification information acquiring module 2120, the identification information on the client terminal 20*a*. Further, the information transmission module 212 acquires, by the destination setting module 2122, destination information for specifying the registerer 110 of the server device 10 as a destination from the destination storage unit 2123, and sets the acquired destination information in the address/identification information transmitting module 2121.

At Step S101, the information transmission module 212 requests, by the address/identification information transmitting module 2121 for example, the acquisition module 211 to provide the IP address of the client terminal 20*a*. The acquisition module 211 returns the IP address stored in the address storage unit 2113 to the information transmission module 212 in response to the request (Step S102). The information transmission module 212 requests the notification reception module 213 to provide the information indicating a communication protocol compatible with the notification accepting module 2131 and a port number (Step S103). The notification reception module 213 acquires, by the communication information acquiring module 2132, the information indicating the communication protocol and the port number, which are stored in the communication information storage unit 2133, and returns the information indicating the communication protocol and the port number thus acquired to the information transmission module 212 (Step S104).

The information transmission module 212 configures, by the address/identification information transmitting module 2121, a URL from the IP address that is returned from the acquisition module 211 at Step S102, and the information indicating the communication protocol and the port number that are acquired at Step S104 (Step S105).

The information transmission module 212 transmits, by the address/identification information transmitting module 2121, the identification information acquired at Step S100 and the URL configured at Step S105 to the registerer 110 of the server device 10 in accordance with the destination information set at Step S100 (Step S106). In the server device 10, the registerer 110 receives the identification information and URL that are transmitted from the client terminal 20*a*, and the registration processor 1101 and the communication identifier storage unit 1102 registers the identification information and the URL (i.e., the address information) thus received in the registration table in an associated manner. The registerer 110 returns information indicating that registration of the identification information and the URL is completed to the information transmission module 212 (Step S107). The processing at Step S107 may be omitted.

In some cases, the IP address of the client terminal 20*a* may be changed due to a change in a connection environment of the network 30*a*. Therefore, the client terminal 20*a* performs IP address change processing indicated at Step S120. The IP address change processing includes processing from Step S1200 to Step S1207. The client terminal 20*a* repeatedly performs the IP address change processing at Step S120 while the print control program 210 is being executed, for example.

When the change notifying module 2112 detects a change of the IP address (Step S1200), the acquisition module 211 notifies the information transmission module 212 of the changed IP address (Step S1201). The subsequent processing from Step S1202 to Step S1206 is the same as the processing from Step S103 to Step S107 as described above.

That is, upon receiving the changed IP address, the information transmission module 212 requests the notification reception module 213 to provide the information indicating the communication protocol compatible with the notification accepting module 2131 and the port number (Step S1202). The notification reception module 213 returns the information indicating the communication protocol and the port number to the information transmission module 212 in response to the request (Step S1203). The information transmission module 212 configures a URL from the IP address provided by the acquisition module 211 at Step S1201 and the information indicating the communication protocol and the URL that are acquired at Step S1203 (Step S1204).

The information transmission module 212 transmits the identification information acquired at Step S100 and the URL configured at Step S1204 to the registerer 110 of the server device 10 in accordance with the destination information set at Step S100 (Step S1205). In the server device 10, the registerer 110 receives the identification information and the URL transmitted from the client terminal 20a, and registers the identification information and the URL thus received in the registration table in an associated manner. The registerer 110 returns information indicating that registration of the identification information and the URL is completed to the information transmission module 212 (Step S1206).

The information transmission module 212 returns a notification indicating that the registration of the identification information and the URL is completed to the acquisition module 211 (Step S1207). The acquisition module 211 updates, by the change notifying module 2112, the IP address stored in the address storage unit 2113 in accordance with this completion notification, for example.

Figure 18:
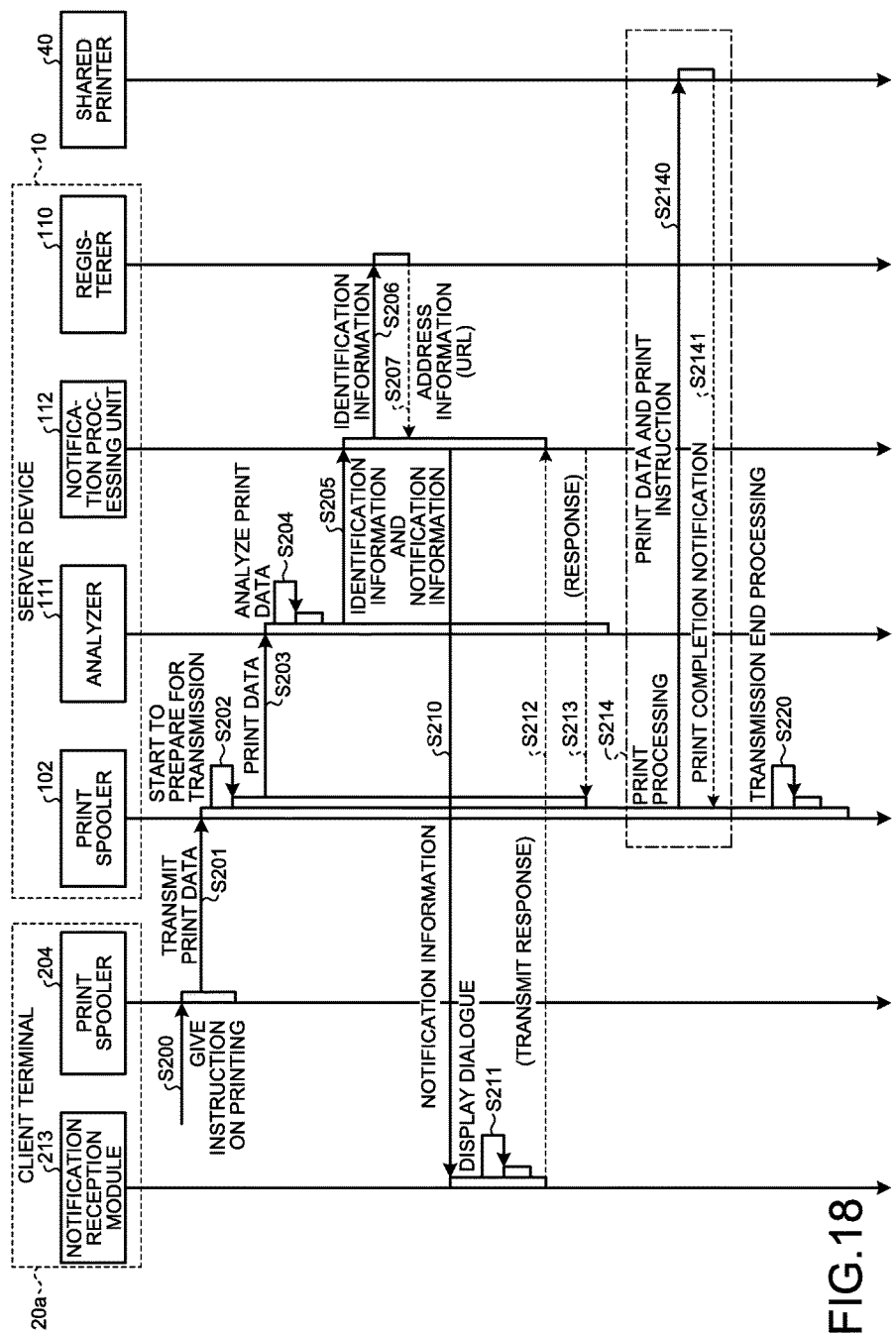
FIG. 18 is a sequence diagram illustrating an example of processing of transmitting notification information from the server device to the client terminal according to the first embodiment.

FIG. 18 is a sequence diagram illustrating an example of processing of transmitting the notification information from the server device 10 to the client terminal 20a according to the first embodiment. In FIG. 18, the same components as those illustrated in FIG. 4 and FIG. 5 as described above are denoted by the same signs, and detailed explanation thereof will be omitted.

For example, it is assumed that, in the client terminal 20a, the document information generator 205 generates document data, and instruction on printing of the generated document data is given by user operation. In the client terminal 20a, the print processing module 221 converts the document data to print data in accordance with the instruction, adds the identification information for identifying the client terminal 20a to the converted print data, and sends the print data to the print spooler 204.

The client terminal 20a instructs the print spooler 204 to perform printing of the print data converted from the document data (Step S200). In the print spooler 204, the print data manager 2040 transmits, by the information transmitter 2041, the print data to the print spooler 102 of the server device 10 in accordance with the destination information stored in the destination storage unit 2042, in response to the instruction (Step S201).

In the server device 10, upon receiving the print data from the print spooler 204 of the client terminal 20a, the print spooler 102 starts to prepare for transmission of the received print data to the shared printer 40 (Step S202). The print spooler 102 transmits, by the print data manager 1020, the print data received from the print spooler 204 to the analyzer 111, and requests the analyzer 111 to analyze the print data (Step S203).

In response to this request, the analyzer 111 analyzes, by the print data analyzer 1110, the print data received from the print spooler 102, acquires the notification information based on the analysis result, and extracts the identification information from the print data (Step S204). The analyzer 111 sends, by the analysis result notifier 1111, the identification information and the notification information, which are acquired based on the print data, to the notification processor 112, and requests the notification processor 112 to transmit the notification information to the client terminal 20a (Step S205).

In response to this request, the notification processor 112 sends the identification information that has been sent from the analyzer 111 to the registerer 110 (Step S206). The registerer 110 refers to, by the address information acquirer 1103 for example, the registration table based on the identification information sent from the analyzer 111, and acquires the address information (URL) associated with the identification information. The registerer 110 sends, by the address information acquirer 1103, the acquired address information to the notification processor 112 (Step S207).

The notification processor 112 transmits, by the notification transmitter 1120, the notification information that has been sent from the analyzer 111 at Step S205 to the client terminal 20a (Step S210). The client terminal 20a receives, by the notification reception module 213, the notification information transmitted from the server device 10. The received notification information is received by the notification accepting module 2131. The notification accepting unit 213 sends the received notification information to the display information generating module 2130.

The display information generating module 2130 generates display information for displaying either the dialogue box 300a or the dialogue box 300b as described above, based on the sent notification information. The display information generating module 2130 displays, by the display unit 202, either the dialogue box 300a or the dialogue box 300b based on the generated display information on the display 2007 (Step S211).

If the dialogue box displayed at Step S211 is the dialogue box 300b illustrated in FIG. 16B, in which a reply from the client terminal 20a is requested, the client terminal 20a replies, to the server device 10 by the notification reception module 213, a response to operation performed on any of the "continue" button 305a and the "cancel" button 305b in the dialogue box 300b (Step S212). The server device 10 sends the response to the notification processor 112. The notification processor 112 returns a response to the reply to the print spooler 102 (Step S213).

If the notification reception module 213 displays the dialogue box 300b and the "continue" button 305a in the dialogue box 300b is operated or if the notification reception module 213 displays the dialogue box 300a, the print spooler 102 performs printing of the print data prepared at Step S202 (Step S214).

Specifically, the print spooler 102 transmits, by the print data transmitter 1021, the print data for which transmission is prepared at Step S202 and a print instruction on the print data to the shared printer 40 (Step S2140). The shared printer 40, upon completing the printing of the transmitted print data, transmits a notification indicating print completion to the print spooler 102 (Step S2141). The print spooler 102 performs the operation at Step S214 on all pieces of print data for which transmission is prepared at Step S202. Upon completing the print processing on all pieces of print data for which transmission is prepared at Step S202, the print spooler 102 ends the processing of transmitting print data to the shared printer 40 (Step S220).

As described above, in the first embodiment, the client terminal 20a transmits the identification information for identifying the client terminal 20a and the address information for indicating an address of the client terminal 20a on the network 30a to the server device 10 in advance, and registers the identification information and the address information in the server device 10. The server device 10 extracts the identification information from print data transmitted from the client terminal 20a, and acquires the address information associated with the extracted identification information from registered combinations of the identification information and the address information. With this configuration, when information for which a notification needs to be given to the client terminal 20a is generated while the print data is being printed for example, the server device 10 can transmit the notification using the acquired address information, so that the server device 10 can flexibly notify the client terminal 20*a* of information.

According to the first embodiment of the present invention, when a client terminal performs printing via a server device, the server device can flexibly notify the client terminal of information on printing.

In the above description, the information transmission module 212 in the client terminal 20*a* performs transmission to the server device 10 by using the URL related to the client terminal 20*a* as the address information, and the server device 10 registers the URL in association with the identification information on the client terminal 20*a*. However, the present invention is not limited to this example, but it may be possible to use different information as the address information for transmitting the notification information.

As one example, the information transmission module 212 may use an electronic mail address of a user who uses the client terminal 20*a* as the address information for transmitting the notification information. In this case, the server device 10 registers, in the registerer 110, the electronic mail address serving as the address information and the identification information on the client terminal 20*a* in the registration table in an associated manner.

At Step S14 in FIG. 15, the server device 10 writes the display information for displaying either the dialogue box 300*a* or the dialogue box 300*b* as illustrated in FIGS. 16A and 16B based on the notification information using HyperText Markup Language (HTML), for example. The server device 10 transmits an electronic mail, in which the display information written by HTML is embedded, in accordance with the electronic mail address serving as the address information. A user of the client terminal 20*a* can receive the electronic mail using the client terminal 20*a* or a different terminal device of the user, and check a notification from the server device 10.

The present invention is not limited to this example, but the server device 10 may publish an HTML file, in which the display information is written by HTML, over the network 30*a*, and embeds a URL of the HTML file in an electronic mail. A user receives the electronic mail by the client terminal 20*a* or a different terminal device, and designates the URL written in the received electronic mail. Accordingly, the user can display the dialogue box 300*a* or the dialogue box 300*b* in the terminal device that has received the electronic mail, and check a notification from the server device 10.

As described above, by using the electronic mail address as the address information, a user can check a notification from the server device 10 in a terminal device that is different from the client terminal 20*a* that has generated and transmitted the print data.

While the embodiment is described above as a preferred embodiment of the present invention, the present invention is not limited thereto, but various modifications may be made without departing from the scope and the gist of the present invention.

Second Embodiment

Next, a second embodiment of the present invention will be described.

Conventionally, there is a known system that distributes print jobs to image forming apparatuses in accordance with a predetermined condition (for example, Japanese Unexamined Patent Application Publication No. 2016-004363). As one example of the system as mentioned above, there is a known system in which a client terminal generates a print job and transmits the print job to a print server in accordance with an instruction given from a logged-in user, and the print server transmits the print job received from the client terminal to a printer that is designated as an output destination, or the print server stores therein the print job. In the system as described above, in some cases, the print server determines whether the print job received from the client terminal meets a predetermined condition, displays a predetermined UI (for example, a dialogue for notification or confirmation, or the like) on the client terminal of a user who has requested printing, in accordance with the determination result, and transmits the print job to an output destination or stores the print job in the print server.

In the system as described above, it is preferable that, from a security perspective, a request that is issued by the print server to the client terminal to display a predetermined UI be received by a single component (service process) that operates as a shared service in the system, and in this configuration, it is only necessary to prepare a single port for accepting a request (command) from the print server. Here, a function to display a predetermined UI on an operation screen of a logged-in user needs to be provided by a user process that operates in a session of the logged-in user. In this regard, however, when a plurality of users are simultaneously logged in, it is necessary to appropriately distribute processing from a component that has received a UI display request to each of user processes that have one-to-one correspondence with the plurality of users who have logged in simultaneously. However, in the conventional technology, a system for appropriately distributing processing from a component, which has received a request from an external apparatus, to each of user processes that may be present simultaneously.

Figure 19:
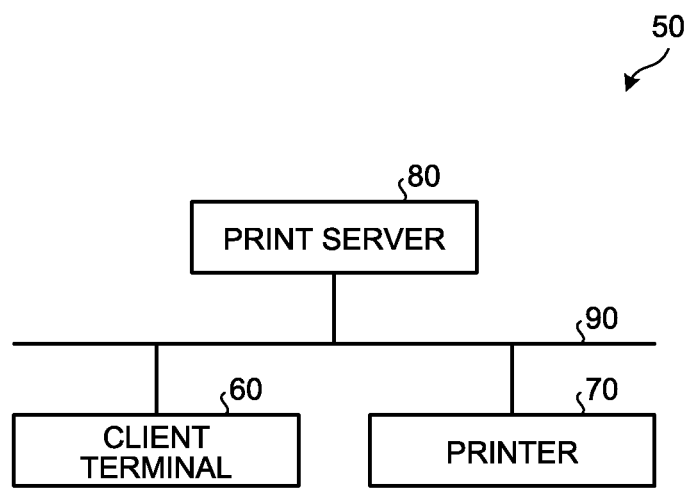
FIG. 19 is a diagram illustrating a configuration example of an information processing system of a second embodiment.

FIG. 19 is a diagram illustrating an example of a configuration of an information processing system 50 of the second embodiment. As illustrated in FIG. 19, the information processing system 50 includes a client terminal 60, a printer 70, and a print server 80, all of which are connected to one another via a network 90, such as the Internet. The apparatuses may be connected in a wireless or wired manner.

The information processing system 50 of the second embodiment is a system that implements both of a function to accumulate a print job in the client terminal 60 and output the print job accumulated in the client terminal 60 from the printer 70 (client pull printing) and a function to accumulate a print job received from the client terminal 60 in the print server 80 and output the print job accumulated in the print server 80 from the printer 70 (pull printing). The client terminal 60 in the information processing system 50 of the second embodiment generates a print job in accordance with an instruction issued by a user, dynamically selects either the client terminal 60 or the print server 80 in accordance with a parameter (set port) of the generated print job, and sends the print job to the selected apparatus. In the second embodiment, the system that implements both of pull printing and client pull printing is described, but the present invention is not limited to this example, and a system that implements only pull printing may be adopted, for example.

For convenience of explanation, an example is illustrated in FIG. 19, in which the information processing system 50 includes only the single client terminal 60 and the single printer 70, but the present invention is not limited to this example, and the numbers of the apparatuses can be changed arbitrarily.

The client terminal 60 is a terminal used by one or more users. For example, the user can use the client terminal 60 for works, tasks, or any other operation. The client terminal 60 is configured with a personal computer (PC), for example. The client terminal 60 may be configured to be used by a single user in a dedicated manner, or may be configured to be shared by a plurality of users. A detailed configuration of the client terminal 60 will be described later.

The print server 80 is one example of an "information processing apparatus", which determines whether a print job received from the client terminal 60 meets a predetermined condition and performs processing according to a determination result. For example, the print server 80 performs processing of displaying a predetermined UI (for example, a dialogue for notification or confirmation, or the like) on the client terminal 10 of a user who has issued a print request, and then transmitting the print job to an output destination (any of the printers 70) or storing the print job in the print server 80.

The printer 70 is an apparatus that outputs a print job accumulated in the client terminal 60 or the print server 80. Here, the printer 70 is described as one example of an output apparatus, but the present invention is not limited to this example, and any kinds of output apparatuses may be adopted. For example, an image forming apparatus, such as an MFP, a copier, a scanner, or an LP may be adopted as the output apparatus, or an apparatus, such as a projector, that performs displaying and output may be adopted as the output apparatus.

Figure 20:
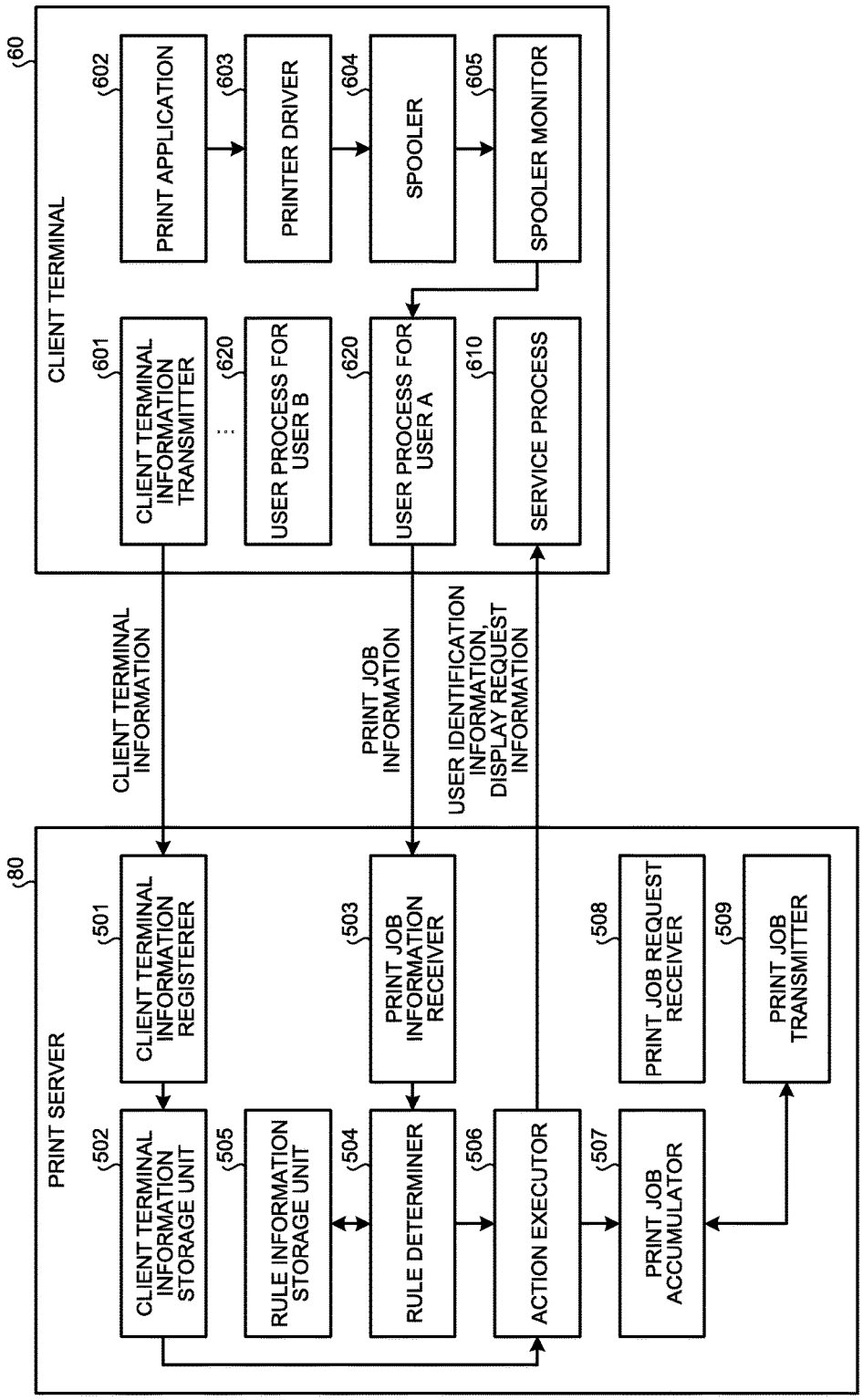
FIG. 20 is a diagram illustrating an example of functions of a client terminal and a print server.

FIG. 20 is a diagram illustrating an example of functions of the client terminal 60 and the print server 80. For convenience of explanation, functions related to the second embodiment are illustrated in FIG. 20, but the functions of the client terminal 60 and the print server 80 are not limited to this example.

First, functions of the client terminal 60 will be described. In this example, as a program that operates on an OS of the client terminal 60, a client terminal information transmitter 601, a print application 602, a printer driver 603, a spooler 604, a spooler monitor 605, a service process 610, and a plurality of user processes 620 that have one-to-one correspondence with a plurality of logged-in users, are provided.

The client terminal information transmitter 601 transmits client terminal information that can identify the client terminal 60 to the print server 80 when the information processing system 50 is activated (when power of each of the apparatuses is turned on). In this example, the client terminal information includes a client name indicating a name of the client terminal 60, and an IP address for identifying the client terminal 60 on the network 90. An address of the print server 80 that serves as a transmission destination of the client terminal information is registered in advance.

The print application 602 has a function to generate original data (source data of a print job), such as document data, in accordance with operation performed by a logged-in user, a function to display a print setting screen, a function to receive a print instruction on the original data from the print setting screen, and the like. In this example, when a user designates printing of original data from the print setting screen, the user designates the original data to be a target as well as a printer icon corresponding to the printer that is registered in the client terminal 60. That is, the print instruction includes at least designation of the original data to be printed and designation of the printer icon. In the client terminal 60, a plurality of printer icons for specifying print destinations are generated (registered), and the printer drivers 603 and ports used as setting values are also set. In this example, the printer driver 603 is provided for each of the printer icons. When the print application 602 receives a print instruction from the print setting screen, the print application 602 transmits a print request, which includes original data designated by the print instruction and which requests printing of the original data, to the printer driver 603 corresponding to the printer icon designated by the received print instruction. In this example, the print request is sent to the printer driver 603 via the OS. The OS adds a client name to the print request received from the print application 602 and sends the print request to the printer driver 603.

The printer driver 603 provides a function to generate a print job. Upon receiving the print request from the print application 602, the printer driver 603 generates a print job based on the print request, and sends, to the spooler 604, information that includes the generated print job and the client name added to the print request (referred to as "print job information" in the description below). The print job includes drawing data and print information indicating information needed to print the drawing data. The print information includes a printing command, port information indicating a port, a printing condition (the number of copies, color setting, and the like), user information for identifying a user who has issued the print request, and the like. The information as described above may be written in an arbitrary language, such as printer job language (PJL), or may be defined by a standard format, such as Windows (registered trademark).

The spooler 604 provides a function to temporarily store therein the print job information generated by the printer driver 603, and sequentially perform processing. The spooler monitor 605 monitors accumulation of the print job information in the spooler 604. In this example, the spooler monitor 605 refers to the port information included in a print job accumulated in the spooler 604 and determines whether an output destination of the print job is the printer 70 that is used in the information processing system 50 (used by client pull printing or pull printing), to thereby determine whether the print job is a job for the information processing system 50. When determining that the print job is the job for the information processing system 50, the spooler monitor 605 retrieves print job information including the print job from the spooler 604, and sends the print job information to the user process 620 corresponding to a user who has issued the print instruction.

The service process 610 operates, as a shared service in the system (continues to operate while the client terminal 60 is activated), regardless of a login state of a user (regardless of presence or absence of a user who has authenticated and logged in). The service process 610 is system software for supporting operation and use of the client terminal 60 by managing and controlling hardware of the client terminal 60. The service process 610 will be described in detail later.

The plurality of user processes 620 have one-to-one correspondence with accounts of a plurality of users who are authorized to use the client terminal 60, and each of the user processes 620 operates in each user session. The user processes 620 are application software for operating hardware resources of the client terminal 60 to provide predetermined functions. The account is information for using the client terminal 60 (information for login), and may be configured with a user ID for uniquely identifying a user or may be configured with a combination of a user name (account name) and a password. Each of the user processes 620 is activated when a corresponding user is authenticated and logged in, and terminated when the user logs off. That is, the user processes 620 operate while the users are logged in, and are terminated when the users are logged off (do not operate). The "log in" indicates a state in which presence of a user account is confirmed (authenticated) and use of the client terminal 60 is permitted, whereas "log off" indicates a state in which the user finishes using the client terminal 60 (a state in which the authority to use the client terminal 60 is abandoned, that is, a state in which a logged-in state is not maintained). The login and logoff of a user is managed by the OS, and the user processes 620 are activated and terminated in accordance with a command issued by the OS.

Here, the OS has a function to perform authentication processing of determining whether a user has the authority to use the client terminal 60. In this example, in a state in which the user is not yet authenticated, an account input screen for accepting input of an account (a combination of a user name and a password, or the like) is displayed on a display unit (a display unit 16 included in the client terminal 60, which will be described later), and the OS performs the authentication processing using the account accepted via the account input screen. For example, in a system in which an external server holds information for confirming (authenticating) the identity of a user (hereinafter, the information is referred to as "source information"), the OS may send the account that has been accepted via the account input screen to the external server, request the external server to perform authentication processing, and receive a processing result. Further, in a system in which the client terminal 60 manages the source information, the OS may perform authentication processing of determining whether the source information that is held in advance in the client terminal 60 includes the account that has been received via the account input screen. If the OS authenticates the user (if a result of the authentication processing is positive), the user process 620 corresponding to the user is activated (enabled).

While the user process 620 will be described in detail later, when receiving the print job information from the spooler monitor 605, the user process 620 can determine whether an output destination of the print job is the own apparatus or the print server 80 by checking the port information on the print job, which is included in the print job information. If it is determined that the output destination of the print job is the print server 80, the user process 620 transmits the print job information received from the spooler monitor 605 to the print server 80 without change (without performing rule determination or the like, which will be described later). Operation of the user process 620 in a case where the output destination of the print job is the own apparatus will be indicated in the description below.

Next, functions of the print server 80 will be described. As illustrated in FIG. 20, the print server 80 includes a client terminal information registerer 501, a client terminal information storage unit 502, a print job information receiver 503, a rule determiner 504, a rule information storage unit 505, an action executor 506, a print job accumulator 507, a print job request receiver 508, and a print job transmitter 509.

Upon receiving the client terminal information from the client terminal 60, the client terminal information registerer 501 registers the received client terminal information in the client terminal information storage unit 502. For example, as illustrated in FIG. 21, the client terminal information registerer 501 registers therein the client terminal information (a client name and an IP address in this example) for each ID (a serial number or the like) assigned to each client terminal information, in an associated manner.

Referring back to FIG. 20, the print job information receiver 503 receives the print job information from the client terminal 60. The rule determiner 504 determines an action (specify an action) to be executed by the action executor 506, based on the rule information stored in the rule information storage unit 505 and the print job that is included in the print job information received by the print job information receiver 503. FIG. 22 is a diagram illustrating an example of the rule information stored in the rule information storage unit 505. In the example in FIG. 22, the rule information is a set of combinations of conditions and actions. For example, if the print information on a print job matches a condition indicating that "color printing is designated", operation to "perform conversion to black-and-white, notify a user of output in black-and-white, and accumulate or output a print job to a designated printer after notification" is determined as corresponding actions. That is, an action to perform conversion to black-and-white, an action to notify the user of output in black-and-white, and an action to accumulate or output a print job to a designated printer after notification are determined (a plurality of actions are determined in this example). For another example, if the print information on a print job matches a condition indicating that "a printer A is designated as an output destination", operation to "accumulate the print job in the print server 80" is determined as a corresponding action. For still another example, if the print information on a print job matches a condition indicating that "a printer B is designated as an output destination", operation to "output the print job to the printer B without change" is determined as a corresponding action.

Figure 23:
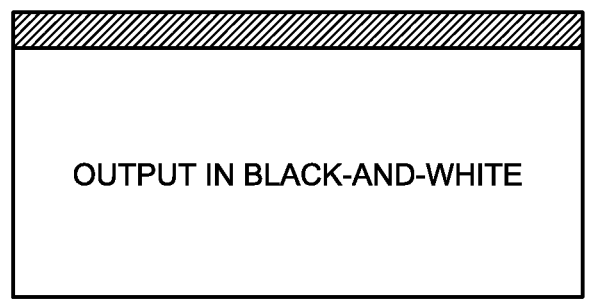
FIG. 23 is a diagram illustrating an example of a dialogue.

The rule determiner 504 is one example of a "determining unit", and determines whether display processing of displaying information on the client terminal 60 is needed based on the print job received from the client terminal 60. More specifically, the rule determiner 504 determines whether the display processing is needed based on the rule information, in which processing to be executed is associated with one or more conditions, and the print job. In this example, the display processing is processing of displaying a dialogue for giving a notification to a user or displaying a dialogue for accepting a confirmation input from a user. For example, it is assumed that operation to "perform conversion to black-and-white, notify a user of output in black-and-white, and accumulate or output a print job to a designated printer after notification" is determined as corresponding actions. In this case, the action to "notify a user of output in black-and-white" means that display processing is performed to display, on the client terminal 60, a dialogue for notifying the user of output in black-and-white as illustrated in FIG. 23.

Figure 24:
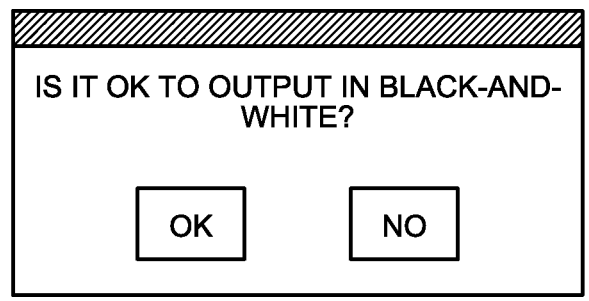
FIG. 24 is a diagram illustrating an example of the dialogue.

Examples of the rule information are not limited to those illustrated in FIG. 22, and combinations of conditions and actions may be set arbitrarily. For example, a condition indicating that "color printing is designated" may be associated with actions to "perform conversion to black-and-white, confirm whether output in black-and-white is permitted, and accumulate or output a print job to a designated printer if user permission is obtained". Here, the action to "ask a user for confirmation whether output in black-and-white is permitted" means that display processing is performed to display, on the client terminal 60, a dialogue for accepting a confirmation input as to whether output in black-and-white is permitted as illustrated in FIG. 24. Further, the action to "accumulate or output a print job to a designated printer if user permission is obtained" means that the print job is accumulated in the print server 80 or output to a designated printer if a confirmation input for permitting output in black-and-white is accepted in the dialogue for accepting the confirmation input as to whether output in black-and-white is permitted (if operation of pressing an "OK" button illustrated in FIG. 24 is accepted in this example).

For example, in some cases, a plurality of kinds of display processing (processing of displaying a dialogue for giving a notification to a user and processing of displaying a dialogue for accepting a confirmation input from the user) may be determined for a single print job. In this case, the rule determiner 504 causes the action executor 506 to perform the plurality of kinds of display processing (actions) thus determined.

Referring back to FIG. 20, the action executor 506 executes an action determined by the rule determiner 504. Hereinafter, an example will be described in which the rule determiner 504 determines display processing as an action (the rule determiner 504 determines that the display processing is needed). When the rule determiner 504 determines that the display processing is needed, the action executor 506 transmits, to the client terminal 60, user identification information capable of identifying a user corresponding to the print job, and display request information indicating information for requesting execution of the display processing. In this example, the action executor 506 has a function of an "information transmitting unit".

The display request information includes information needed to perform the display processing determined by the rule determiner 504, information for requesting execution of the display processing (request information), and the like. For example, when the rule determiner 504 determines that it is necessary to perform display processing of displaying a dialogue for notifying a user of output in black-and-white as illustrated in FIG. 23 on the client terminal 60, the display request information includes request information for requesting execution of processing of displaying the dialogue illustrated in FIG. 23, and information indicating text ("output in black-and-white") and layout for configuring the dialogue illustrated in FIG. 23. The information indicating text and layout for configuring the dialogue illustrated in FIG. 23 is one example of the information needed to perform the processing of displaying the dialogue illustrated in FIG. 23. Further, in this example, the action executor 506 extracts, as the user identification information capable of identifying a user corresponding to the print job, the above-described user information on the print job included in the print job information received by the print job information receiver 503. Furthermore, in this example, the action executor 506 specifies a piece of client terminal information including a client name that is included in the print job information received by the print job information receiver 503 among pieces of client terminal information stored in the client terminal information storage unit 502, and specifies the client terminal 60 that serves as a transmission destination of the display request information and the user identification information based on an IP address included in the specified client terminal information. The display request information and the user identification information are transmitted to the specified client terminal 60.

For example, when the rule determiner 504 determines that a plurality of kinds of display processing are needed, the action executor 506 transmits the user identification information and the display request information to the client terminal 60 for each kind of the display processing, and the client terminal 60 (a controller 615 to be described later) controls execution of the display processing for each combination of the user identification information and the display request information.

Further, when the rule determiner 504 determines that the print job is to be output to the printer 70, the action executor 506 transmits the print job received from the client terminal 60 to the printer 70. In contrast, when the rule determiner 504 determines that the print job is to be accumulated, the action executor 506 accumulates (stores) the print job received from the client terminal 60 in the print job accumulator 507.

The print job request receiver 508 receives, from the printer 70, a print job request for requesting a print job. The print job transmitter 509 retrieves a print job stored in the print job accumulator 507 and transmits the print job to the printer 70 in accordance with the print job request received by the print job request receiver 508.

Next, detailed functions of the service process 610 and the user processes 620 included in the client terminal 60 will be described with reference to FIG. 25.

Figure 25:
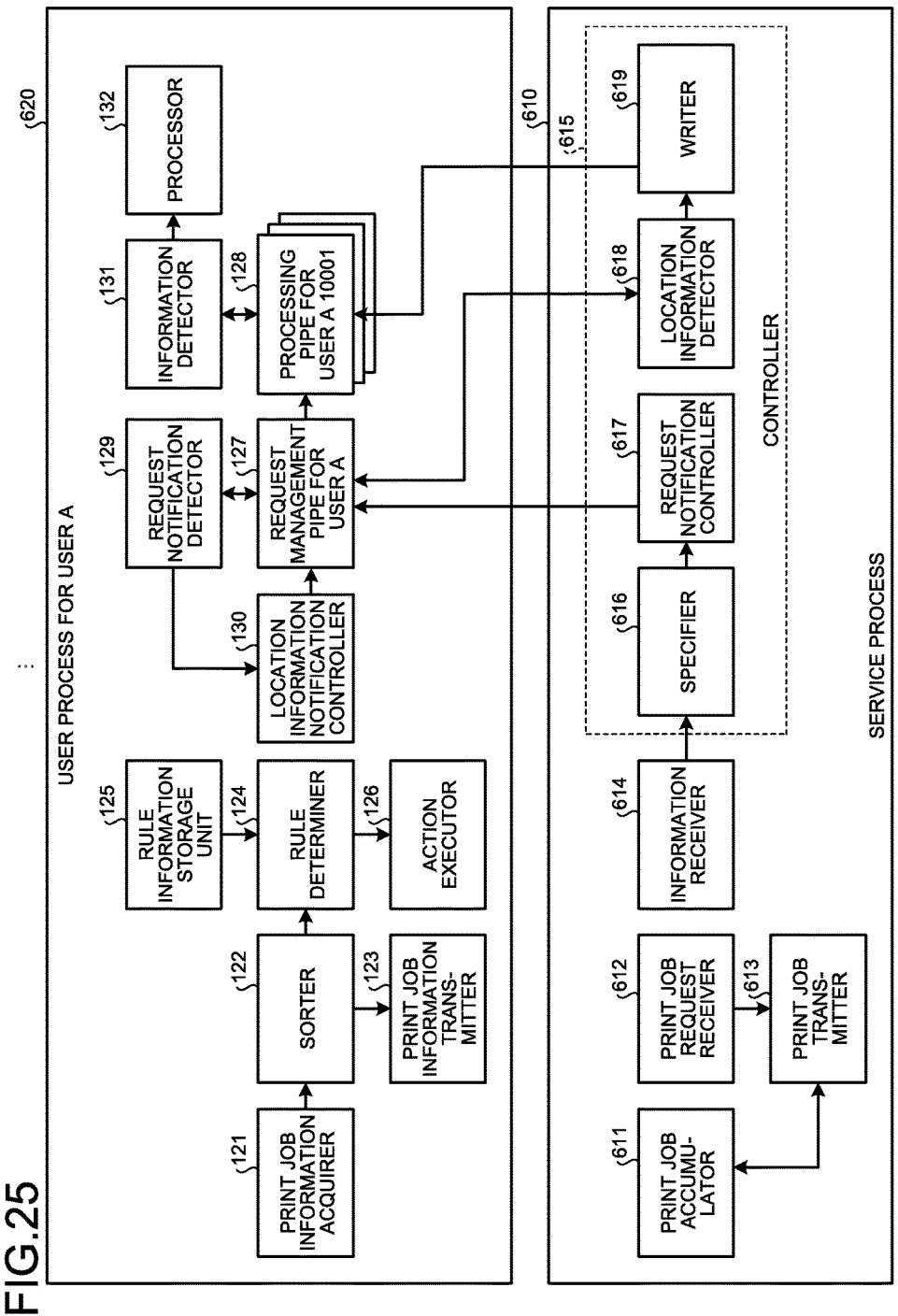
FIG. 25 is a diagram illustrating an example of detailed functions of a service process and a user process included in the client terminal.

As illustrated in FIG. 25, the service process 610 includes a print job accumulator 611, a print job request receiver 612, a print job transmitter 613, an information receiver 614, and the controller 615.

The print job accumulator 611 accumulates a print job. Functions of the print job accumulator 611 will be indicated in the description of the user processes 620, which will be given later. The print job request receiver 612 accepts a print job request from the printer 70. The print job transmitter 613 retrieves a print job stored in the print job accumulator 611 and transmits the print job to the printer 70 in accordance with the print job request received by the print job request receiver 612. These functions are the same as those of the print server 80.

The information receiver 614 receives the user identification information and the display request information as described above from the print server 80.

The controller 615 causes the user process 620, which corresponds to a user identified by the user identification information among the plurality of user processes 620, to perform display processing requested by the display request information. The controller 615 includes a specifier 616, a request notification controller 617, a location information detector 618, and a writer 619.

The specifier 616 checks the user identification information (the above-described user information included in the print information in this example) received by the information receiver 614, and specifies the user process 620 corresponding to a user identified by the user identification information.

The request notification controller 617 performs control to give a request notification, which indicates that a request for execution of the display processing is received, to the user process 620 specified by the specifier 616 (the user process 620 corresponding to the user identified by the user identification information). Here, the request notification controller 617 writes the request notification in a request management pipe 127 to be described later (an example of a "request management intermediate medium"), which is included in the user process 620 specified by the specifier 616, as the control to give the request notification to the user process 620. It is sufficient that the request notification is information capable of specifying the processing (display processing) for which an execution request has been accepted, and information for executing the processing is not needed. In this example, the request management pipe 127 is a named pipe, and a name including the above-described user information is assigned. In this example, the request notification controller 617 specifies the request management pipe 127 including the user information received by the information receiver 614, and writes the request notification in the specified request management pipe 127.

For convenience of explanation, functions of the user process 620 will be described below. Here, the user process 620 of a user A will be described, but the same applies to the other user processes 620. As illustrated in FIG. 25, the user process 620 includes a print job information acquirer 121, a sorter 122, a print job information transmitter 123, a rule determiner 124, a rule information storage unit 125, an action executor 126, the request management pipe 127, a processing pipe 128, a request notification detector 129, a location information notification controller 130, an information detector 131, and a processor 132.

The print job information acquirer 121 acquires the print job information from the spooler monitor 605 described above. The sorter 122 checks the port information included in the print job information acquired by the print job information acquirer 121, and determines an output destination of the print job. The sorter 122 sends the print job included in the print job information acquired by the print job information acquirer 121 to the rule determiner 124 when the output destination of the print job is the own apparatus. The sorter 122 sends the print job information acquired by the print job information acquirer 121 to the print job information transmitter 123 when the output destination of the print job is the print server 80. The print job information transmitter 123 transmits the print job information sent from the sorter 122 to the print server 80.

The rule determiner 124 determines an action to be executed by the action executor 126, based on the rule information stored in the rule information storage unit 125 and the print job sent from the sorter 122. The action executor 126 executes the action determined by the rule determiner 124. The above-described functions are the same as those of the print server 80. For example, when the rule determiner 124 determines that the print job is to be output to the printer 70, the action executor 126 transmits the print job sent from the sorter 122 to the printer 70. In contrast, when the rule determiner 124 determines that the print job is to be accumulated, the action executor 126 accumulates (stores) the print job sent from the sorter 122 in the print job accumulator 611 of the service process 610.

The request management pipe 127 is one example of the "request management intermediate medium". The request management pipe 127 is an intermediate medium that includes the user information for identifying the user corresponding to the user process 620, and used to detect a request notification and give a notification of location information to be described later. In this example, the request management pipe 127 is a named pipe to which a name including the user information is assigned, but it is not limited thereto. In this example, the user process 620 generates the request management pipe 127 and the processing pipe 128 at the time of activation. The processing pipe 128 is one example of a "processing intermediate medium", and is an intermediate medium for accepting information needed for processing (display processing in this example) to be performed by the user process 620. In this example, the processing pipe 128 is a named pipe, and a unique name is assigned to each of the processing pipes 128. Further, the processing pipe 128 is generated for a single processing (processing corresponding to a single action).

The request notification detector 129 detects a request notification. In this example, the request notification detector 129 can detect the request notification by detecting whether the request notification is written in the request management pipe 127.

The location information notification controller 130 performs controls, when the request notification detector 129 detects the request notification, to notify the controller 615 in the service process 610 of location information (the name assigned to the processing pipe 128 in this example), which is capable of specifying a location of the processing pipe 128 that is for accepting information needed to perform display processing corresponding to the request notification. In this example, the location information notification controller 130 writes the location information in the request management pipe 127 as the control to notify the controller 615 of the location information.

The information detector 131 detects information written in the processing pipe 128. The processor 132 is provided for each of the processing pipes 128, and performs processing using information stored in the corresponding processing pipe 128. More specifically, upon detecting that information is written in the processing pipe 128, the information detector 131 notifies the corresponding processor 132 that the information is written. Upon receiving the notification, the processor 132 performs processing using the information stored in the corresponding processing pipe 128. For example, if the information stored in the processing pipe 128 is information needed to perform display processing of displaying the dialogue illustrated in FIG. 23, the processor 132 performs processing of displaying the dialogue illustrated in FIG. 23 using the information stored in the processing pipe 128. In this example, the processor 132 is provided for each of the processing pipes 128, and therefore, it is possible to simultaneously perform a plurality of kinds of processing that have one-to-one correspondence with a plurality of actions. For example, it is possible to simultaneously perform processing of displaying the dialogue as illustrated in FIG. 23 and processing of displaying the dialogue as illustrated in FIG. 24.

The functions of the controller 615 of the service process 610 will be further described below. The location information detector 618 illustrated in FIG. 25 detects the location information. In this example, the location information detector 618 detects the location information by detecting whether the location information is written in the request management pipe 127 included in the user process 620 specified by the specifier 616.

When the location information detector 618 detects the location information, the writer 619 writes information needed for the display processing requested by the display request information, in the processing pipe 128 specified by the detected location information. In this example, the writer 619 writes, in the processing pipe 128 specified by the location information, information needed to perform the display processing (for example, information indicating text and layout for configuring a dialogue, or the like), which is included in the display request information received by the information receiver 614.

Figure 26:
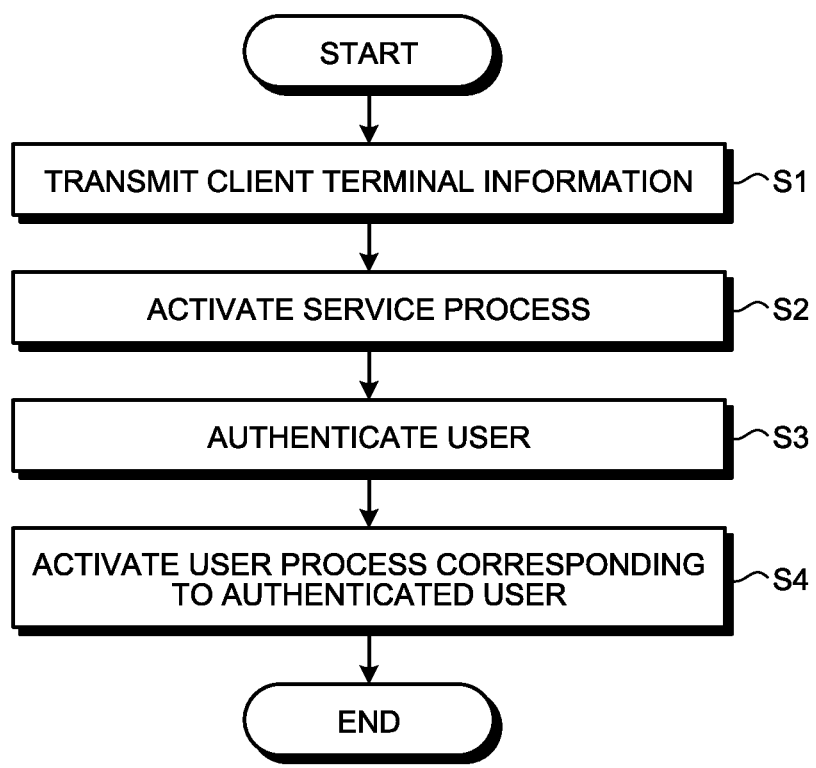
FIG. 26 is a flowchart illustrating an example of operation that is performed when the client terminal is activated.

FIG. 26 is a flowchart illustrating an example of operation performed when the client terminal 60 is activated. First, when power supply to the client terminal 60 is started (when power is turned on), the client terminal information transmitter 601 transmits the above-described client terminal information to the print server 80 (Step S). The OS of the client terminal 60 activates the service process 610 (Step S2). The OS authenticates a user (Step S3), and activates the user process 620 corresponding to the authenticated user (Step S4).

Figure 27:
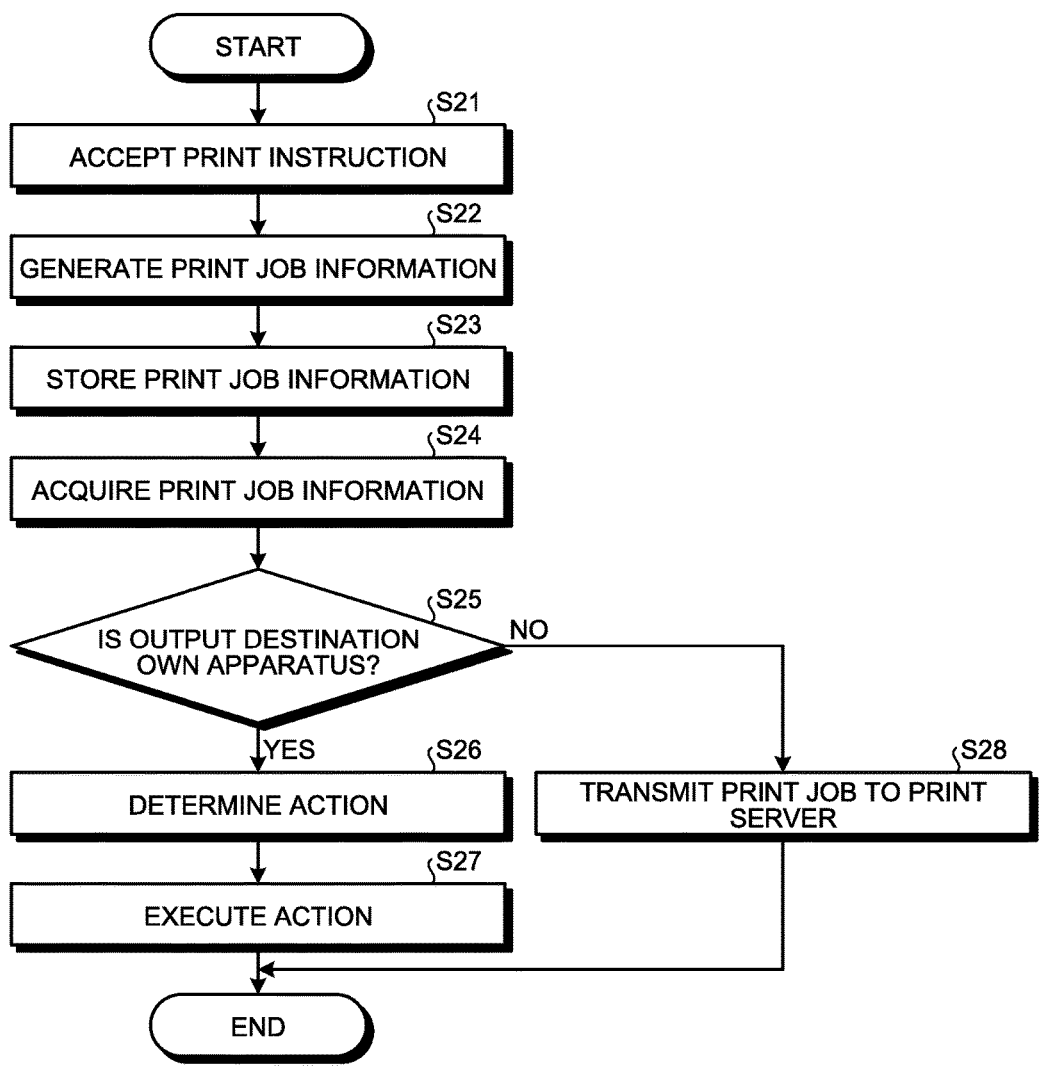
FIG. 27 is a flowchart illustrating an example of operation performed by the client terminal.

FIG. 27 is a flowchart illustrating an example of operation performed by the client terminal 60 after the user process 620 is activated. In this example, when a user inputs own account and logs into the client terminal 60, the user process 620 configured to operate in a session for the user is activated. As a screen displayed after login, a screen, in which a personal setting of the user is reflected, is displayed. The user activates the print application 602 on the screen and generates original data of a print job. Subsequently, the user gives an instruction on printing of the generated original data. As described above, when the user gives an instruction on printing of the original data, the user designates original data to be printed and an icon corresponding to the printer 70 to be used as an output destination.

The print application 602 receives a print instruction from the user (Step S21), and transmits, to the printer driver 603 corresponding to the printer icon designated by the received print instruction, a print request that includes the original data designated by the print instruction and that requests printing of the original data. In this example, the print request is sent to the printer driver 603 via the OS. The OS adds a client name to the print request received from the print application 602, and sends the print request to the printer driver 603.

Subsequently, the printer driver 603 generates a print job based on the print request that is sent from the print application 602 via the OS, and generates print job information including the generated print job and the client name added to the print request (Step S22). The printer driver 603 sends the print job information generated at Step S12 to the spooler 604. The spooler 604 stores (temporarily stores) therein the print job information received from the printer driver 603 (Step S23).

The spooler monitor 605 continuously monitors registration of print job information in the spooler 604, acquires the print job information from the spooler 604 when the print job information on the information processing system 50 is registered (Step S24), and sends the print job information to the user process 620 that has been activated.

When the print job information acquirer 121 of the user process 620 acquires the print job information, the sorter 122 of the user process 620 checks the port information on the print job included in the print job information, and determines an output destination of the print job (Step S25). If it is determined that the output destination is the own apparatus (YES at Step S25), the rule determiner 124 determines an action to be executed by the action executor 126 based on the rule information stored in the rule information storage unit 125 and the print job sent from the sorter 122 (Step S26). The action executor 126 executes the action determined at Step S26 (Step S27).

In contrast, if it is determined that the output destination is not the own apparatus (NO at Step S25), that is, if it is determined that the output destination is the print server 80 in this example, the sorter 122 transmits the print job information acquired by the print job information acquirer 121 to the print server 80 (Step S28).

Figure 28:
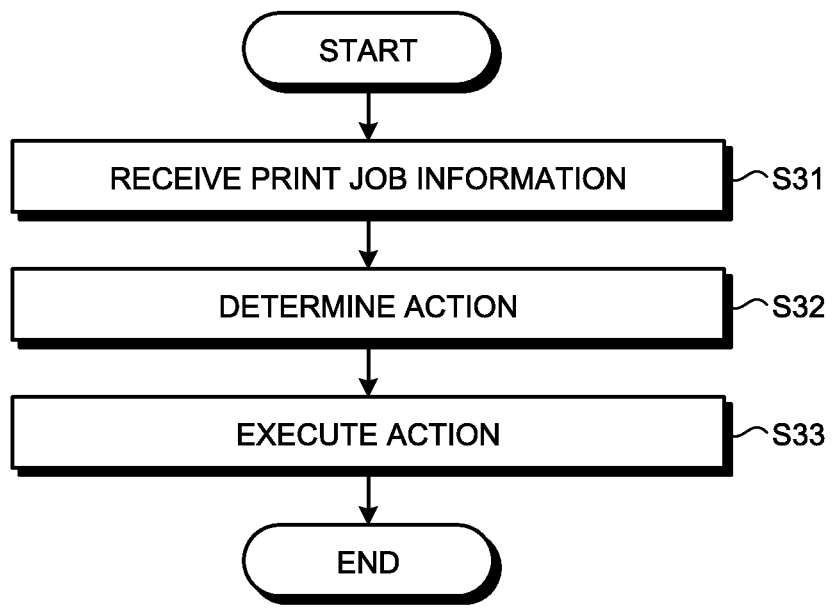
FIG. 28 is a flowchart illustrating an example of operation performed by the print server.

FIG. 28 is a flowchart illustrating an example of operation performed by the print server 80 when the print job information is received from the client terminal 60. As illustrated in FIG. 28, the print job information receiver 503 receives the print job information from the client terminal 60 (Step S31). The rule determiner 504 determines an action to be executed by the action executor 126 based on the rule information stored in the rule information storage unit 125 and the print job sent from the sorter 122 (Step S32). The action executor 126 executes the action determined at Step S32 (Step S33). As described above, when the rule determiner 504 determines that the display processing is needed for example, the action executor 506 transmits the user identification information, which is capable of specifying a user corresponding to the print job included in the print job information received from the client terminal 60, and the display request information, which indicates information for requesting execution of the display processing, to the client terminal 60.

Figure 29:
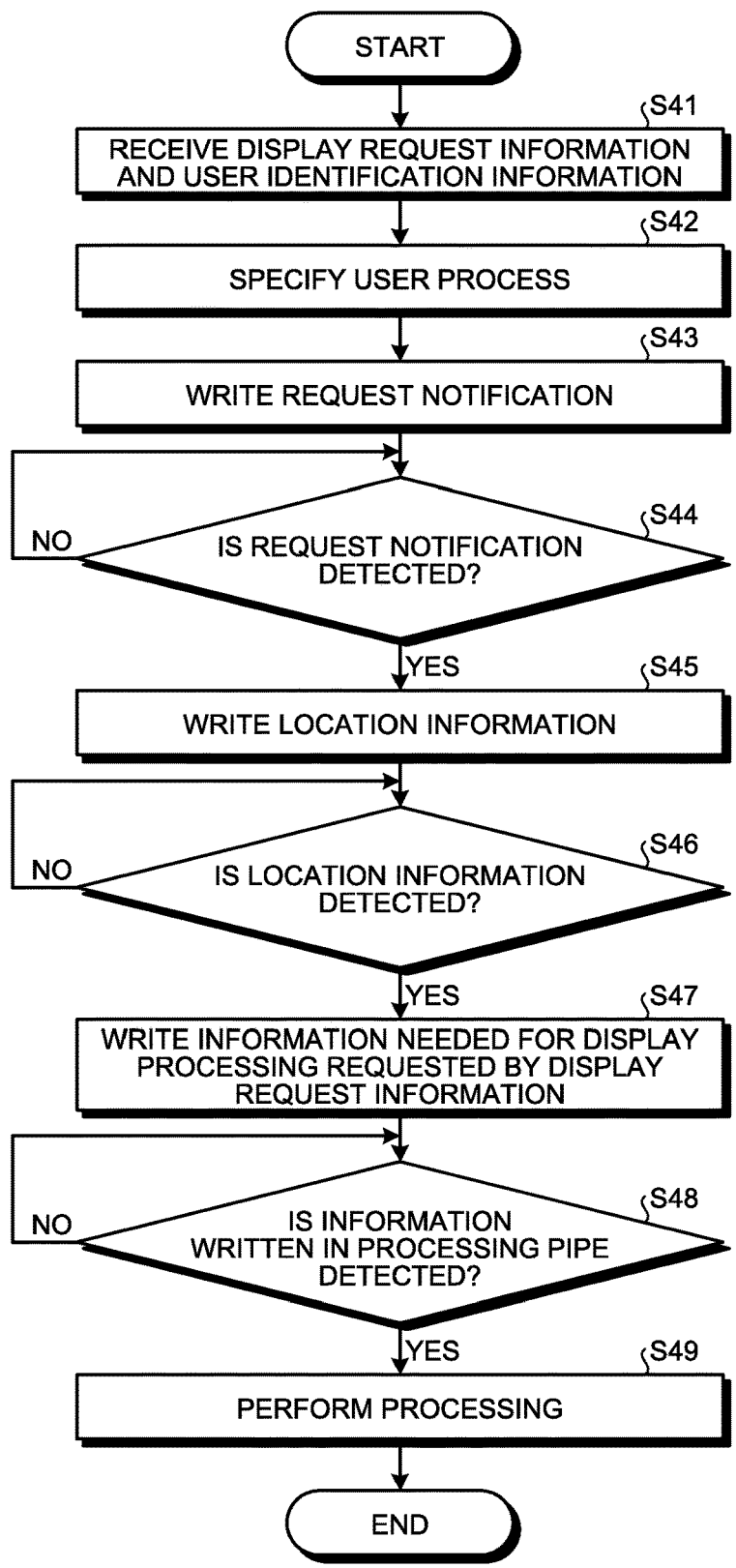
FIG. 29 is a flowchart illustrating an example of operation performed by the client terminal.

FIG. 29 is a flowchart illustrating an example of operation performed by the client terminal 60 when the user identification information and the display request information described above are received from the print server 80. As illustrated in FIG. 29, the information receiver 614 of the service process 610 receives the user identification information and the display request information from the print server 80 (Step S41). The specifier 616 of the service process 610 checks the user identification information received at Step S41, and specifies the user process 620 corresponding to a user specified by the user identification information (Step S42). The request notification controller 617 of the service process 610 writes the above-described request notification to the request management pipe 127 included in the user process 620 specified at Step S42 (Step S43).

If the request notification detector 129 of the user process 620 detects the request notification (YES at Step S44), the location information notification controller 130 of the user process 620 writes, in the request management pipe 127, the location information capable of specifying the location of the processing pipe 128 corresponding to the processing that is requested by the request notification (Step S45).

If the location information detector 618 of the service process 610 detects the location information (YES at Step S46), the writer 619 of the service process 610 writes, in the processing pipe 128 specified by the location information, information needed for the display processing that is requested by the display request information received at Step S41 (Step S47).

If the information detector 131 of the user process 620 detects the information written in the processing pipe 128 (YES at Step S48), the corresponding processor 132 performs the display processing using the information stored in the processing pipe 128 (Step S49).

Figure 30:
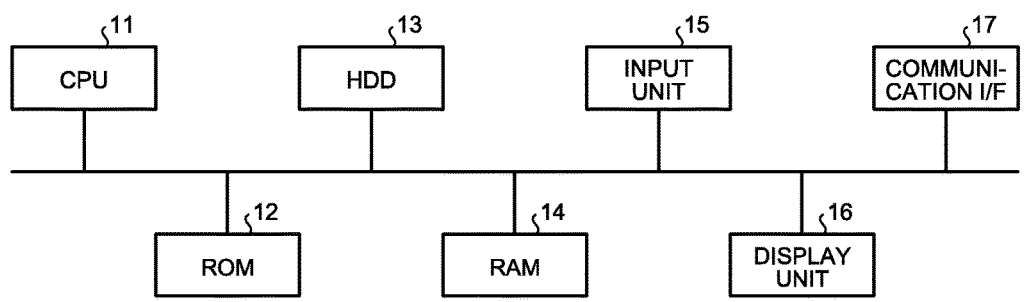
FIG. 30 is a diagram illustrating a hardware configuration example of the client terminal.

FIG. 30 is a diagram illustrating an example of a hardware configuration of the client terminal 60. As illustrated in FIG. 30, the client terminal 60 includes a CPU 11, a ROM 12, a hard disk drive (HDD) 13, a RAM 14, an input unit 15, the display unit 16, and a communication I/F 17. The printer 70 and the print server 80 have the same hardware.

The CPU 11 is an arithmetic device that reads a program and data from a storage device, such as the ROM 12 or the HDD 13, onto the RAM 14, and executes processing to perform comprehensive control and implement various functions in the client terminal 60. The functions of the client terminal 60 as described above are implemented by causing the CPU 11 to perform a program stored in the ROM 12 or the like. The same applies to the functions of the print server 80.

The ROM 12 is one example of a non-volatile semiconductor memory (storage device) capable of storing a program and data even after power is turned off (after power supply to the client terminal 60 is stopped). The ROM 12 stores therein a program, such as BIOS, OS setting, and network setting, which is executed upon activation of the client terminal 60, and stores therein data.

The HDD 13 is one example of a non-volatile storage device that stores therein a program and data. The HDD 13 stores therein an OS, that is basic software for controlling the whole client terminal 60, application software (hereinafter, simply referred to as an "application") that provides various functions on the OS, and the like. The client terminal 60 may use a drive device using a flash memory as a storage medium (for example, a solid state drive (SSD)), instead of the HDD 13.

The RAM 14 is one example of a volatile storage device that temporarily stores therein a program and data, and functions as a work space (work area) for processing performed by the CPU 11.

The input unit 15 is a device used by a user to input various operation signals, and may be configured with, for example, a keyboard, a mouse, or a touch panel. The display unit 16 is a device that displays various kinds of information (for example, a result of processing performed by the client terminal 60, or the like), and may be configured with, for example, a liquid crystal display device. The input unit 15 and the display unit 16 may be configured integrally like a touch panel, for example. Further, the input unit 15 and the display unit 16 may be configured to be used by being connected to each other if needed.

The communication I/F 17 is an interface for connecting the client terminal 60 to the network 90.

As described above, when the print server 80 determines that display processing is needed based on a print job received from the client terminal 60, the print server 80 transmits the user identification information capable of specifying a user corresponding to the print job and the display request information indicating information for requesting execution of the display processing to the client terminal 60. Upon accepting the display request information and the user identification information, the service process 610 of the client terminal 60 causes a user process, which corresponds to a user identified by the received user identification information among the plurality of user processes 620, to perform the display processing requested by the received display request information. With this configuration, it is possible to appropriately distribute processing from the service process 610 that has received a request from outside to each of the user processes 620 that may be present simultaneously.

According to the second embodiment of the present invention, it is possible to appropriately distribute processing from a component that has received a request from outside to each of the user processes that may present simultaneously.

The program executed by the client terminal 60 (the CPU 11) of each of the embodiments described above may be stored in a computer-readable recording medium, such as a compact disc ROM (CD-ROM), a flexible disk (FD), a compact disc recordable (CD-R), a digital versatile disc (DVD), or a universal serial bus (USB), in a computer-installable or computer-executable file format, and then provided. Alternatively, the program may be provided or distributed via a network, such as the Internet. Further, various programs may be incorporated into a ROM or the like in advance, and then provided.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. An information processing system comprising:
a client terminal including processing circuitry configured to,
acquire address information indicating an address of the client terminal on a network,
transmit the address information over the network,
generate identification information, the identification information identifying the client terminal,
modify print data to generate enhanced print data such that the enhanced print data includes the identification information, and
transmit the enhanced print data including the identification information over the network; and
an information processing apparatus including,
a memory configured to store an association between the identification information and the address information; and
processing circuitry configured to,
receive the enhanced print data from the client terminal,
extract the identification information and the print data from the enhanced print data transmitted from the client terminal,
instruct an image forming apparatus to perform printing in accordance with the print data extracted from the enhanced print data, read the address information including the address of the client terminal from the memory based on the identification information extracted from the enhanced print data, and transmit a notification to the client terminal such that the information processing apparatus transmits the notification to the address of the client terminal in real-time when information to be transmitted is generated based on the identification information previously extracted from the enhanced print data.

2. The information processing system according to claim 1, wherein the processing circuitry of the information processing apparatus is further configured to perform processing depending on a content of a response that is returned from the client terminal in response to the notification.

3. The information processing system according to claim 2, wherein the processing circuitry of the information processing apparatus is further configured to selectively instruct the image forming apparatus to cancel printing the print data based on content of the response to the notification.

4. The information processing system according to claim 1, wherein the processing circuitry of the client terminal is further configured to generate the identification information such that the identification information includes a name that is uniquely assigned to the client terminal.

5. The information processing system according to claim 1, wherein the processing circuitry of the client terminal is further configured to, acquire an internet protocol (IP) address of the client terminal on the network, and generate the address information such that the address information includes the IP address of the client terminal.

6. The information processing system according to claim 1, wherein the processing circuitry of the client terminal is further configured to, acquire an electronic mail address of the client terminal on the network, and generate the address information such that the address information includes the electronic mail address of the client terminal.

7. The information processing system according to claim 1, wherein the client terminal further comprises:

a display device configured to display a display information, wherein the processing circuitry of the client terminal is further configured to, generate the display information based on the notification, and display, via the display device, the display information to notify a user of the client terminal.

8. The information processing system according to claim 1, wherein the processing circuitry of the client terminal is further configured to, acquire an internet protocol (IP) address, a port number and a protocol of the client terminal associated with exchanging the notification with the information processing apparatus, generate the address information such that the identification information includes the IP address, port number and the protocol, and transmit the address information to the information processing apparatus in advance of transmission of the enhanced print data.

9. An information processing apparatus connected to a client terminal, the information processing apparatus comprising:

a memory configured to store an association between identification information and address information, the address information including an address of the client terminal; and processing circuitry configured to, receive enhanced print data from the client terminal, the enhanced print data including print data and identification information, the identification information identifying the client terminal, extract the identification information and the print data from the enhanced print data transmitted from the client terminal, instruct an image forming apparatus to perform printing in accordance with the print data extracted from the enhanced print data, read the address information including the address of the client terminal from the memory based on the identification information extracted from the enhanced print data, and transmit a notification to the client terminal such that the information processing apparatus transmits the notification to the address of the client terminal in real-time when information to be transmitted is generated based on the identification information previously extracted from the enhanced print data.

10. The information processing apparatus according to claim 9, wherein the processing circuitry is further configured to perform processing depending on a content of a response that is returned from the client terminal in response to the notification.

11. The information processing apparatus according to claim 10, wherein the processing circuitry is further configured to selectively instruct the image forming apparatus to cancel printing based on the print data based on the content of the response to the notification.

12. The information processing apparatus according to claim 9, wherein the address of the client terminal is an electronic mail address, and the processing circuitry is further configured to transmit the notification to the client terminal via the electronic mail address of the client terminal.

13. The information processing apparatus according to claim 9, wherein the processing circuitry of the information processing apparatus is further configured to, receive the address information including an internet protocol (IP) address, a port number and a protocol of the client terminal, and transmit, via the IP address and port number, the notification to the client terminal using the protocol.

14. A client terminal connected to an information processing apparatus via a network, the client terminal comprising:

processor circuitry configured to, acquire address information indicating an address of the client terminal on the network, transmit the address information over the network to the information processing apparatus, generate print data used for printing by an image forming apparatus, generate identification information, the identification information identifying the client terminal, modify the print data to generate enhanced print data such that the enhanced print data includes the identification information, and transmit the enhanced print data including the identification information to the information processing apparatus; and receive a notification from the information processing apparatus such that the information processing apparatus transmits the notification to the address of the client terminal in real-time when information to be transmitted is generated based on the identification information previously extracted by the information processing apparatus from the enhanced print data transmitted thereto.

15. The client terminal according to claim 14, wherein the processing circuitry is further configured to generate the identification information such that the identification information includes a name that is uniquely assigned to the client terminal.

16. The client terminal according to claim 14, wherein the processing circuitry is further configured to, acquire an internet protocol (IP) address of the client terminal on the network, and generate the address information such that the address information includes the IP address of the client terminal.

17. The client terminal according to claim 14, wherein the processing circuitry is further configured to, acquire an electronic mail address of the client terminal on the network, and generate the address information such that the address information includes the electronic mail address of the client terminal.

18. The client terminal of claim 14, wherein the processing circuitry of the client terminal is further configured to, acquire an internet protocol (IP) address, a port number and a protocol of the client terminal associated with exchanging the notification with the information processing apparatus, generate the address information such that the identification information includes the IP address, port number and the protocol, and transmit the address information to the information processing apparatus in advance of transmission of the enhanced print data.

* * * * *